United States Patent [19]
Kuboki et al.

[11] Patent Number: 5,682,552
[45] Date of Patent: Oct. 28, 1997

[54] DATA COMMUNICATION ADAPTER AND DATA COMMUNICATION TERMINAL APPARATUS FOR PERFORMING DATA TRANSMISSION AND RECEPTION BETWEEN TERMINALS

[75] Inventors: Shigeo Kuboki, Nakaminato; Norihiko Sugimoto, Katsuta; Shunji Inada; Kazuhisa Inada, both of Hitachi; Tomoaki Aoki, Ibaraki-ken; Masahiro Ueno, Hitachi; Yasushi Nakamura, Hitachiota; Eiki Kondoh, Hitachi; Toshihiko Tominaga, Katsuta, all of Japan

[73] Assignees: Hitachi, Ltd., Tokyo; Hitachi Engineering Co., Ltd., Hitachi, both of Japan

[21] Appl. No.: 248,529

[22] Filed: May 24, 1994

Related U.S. Application Data

[63] Continuation of Ser. No. 544,674, Jun. 27, 1990, abandoned.

[30] Foreign Application Priority Data

Jun. 30, 1989 [JP] Japan ................. 1-166694

[51] Int. Cl.[6] .................................. G06F 13/40
[52] U.S. Cl. ........................................... 395/872
[58] Field of Search ........................ 395/309, 310, 395/250, 872–876

[56] References Cited

U.S. PATENT DOCUMENTS

| | | | |
|---|---|---|---|
| 4,646,232 | 2/1987 | Chang et al. | 364/200 |
| 4,777,591 | 10/1988 | Chang et al. | 364/200 |
| 4,858,112 | 8/1989 | Puerzer et al. | 395/325 |
| 4,951,280 | 8/1990 | McCool et al. | 370/85.2 |
| 4,999,771 | 3/1991 | Ralph et al. | 395/329 |
| 5,048,012 | 9/1991 | Gulick et al. | 370/77 |
| 5,130,981 | 7/1992 | Murphy | 370/85.6 |

FOREIGN PATENT DOCUMENTS

| | | |
|---|---|---|
| 0226975 | 12/1986 | European Pat. Off. . |
| 8603607 | 6/1986 | WIPO . |

OTHER PUBLICATIONS

*Wescon Technical Papers*, "IEEE 802.3 Chipset Simplifies LAN Interface", by R.V. Balakrishnan, Oct. 30 to Nov. 2, 1984, Anaheim, California, Los Angeles, U.S.A.

*Primary Examiner*—William M. Treat
*Attorney, Agent, or Firm*—Antonelli, Terry, Stout & Kraus, LLP.

[57] ABSTRACT

In a data communication adapter apparatus for a digital data communication connected between a signal transmission path for transmitting both receive data and transmit data, and a host processor unit for producing frame data to output the frame data therefrom, an internal host bus is newly employed in the data communication apparatus irrelevant to the employment of a CPU dedicated bus, and the transmission/reception data generated and interpreted by the host processor is transferred via the internal host bus, a bus interface, and a system data bus between a transmission memory or a reception memory and a buffer memory. Furthermore, a reception memory (host dedicated reception memory) for storing only the reception data to be interpreted by the host processor is separately provided with another reception memory (CPU dedicated reception memory) for storing only the reception data to be interpreted by a CPU, one reception data to be interpreted by the CPU is once transferred from the transmission/reception control unit to the CPU dedicated memory and thereafter read out via the CPU dedicated bus under the control of the CPU, and the other reception data to be interpreted by the host processor is one stored in the host dedicated reception memory and then read out via the internal host bus and bus interface under the control of the host processor.

18 Claims, 17 Drawing Sheets

FIG. 8A
TRANSMISSION FRAME STATUS

| $2^7$ | $2^6$ | $2^5$ | $2^4$ | $2^3$ | $2^2$ | $2^1$ | $2^0$ |
|---|---|---|---|---|---|---|---|
| CMPL | — | TPTY ERR | TE1 | TE2 | AC1 | AC2 | TRREX |

FIG. 8B
RECEPTION FRAME STATUS

| $2^{15}$ | $2^{14}$ | $2^{13}$ | $2^{12}$ | $2^{11}$ | $2^{10}$ | $2^9$ | $2^8$ |
|---|---|---|---|---|---|---|---|
| — | — | RCVD | ABT | LOV | OCT | NDAT | FCSE |

| $2^7$ | $2^6$ | $2^5$ | $2^4$ | $2^3$ | $2^2$ | $2^1$ | $2^0$ |
|---|---|---|---|---|---|---|---|
| RE1 | RE2 | RAC1 | RAC2 | SAEQ MA | DAEQ MA | FCS | RPTY ERR |

F I G. 10
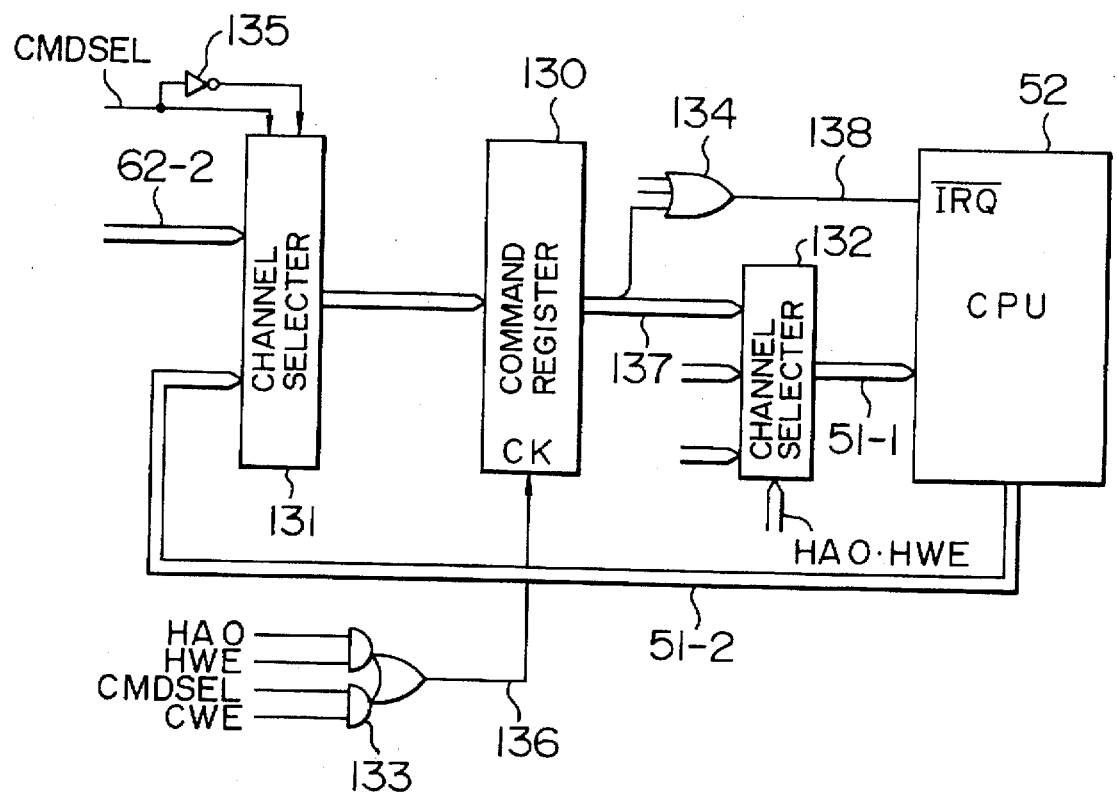
F I G. 11
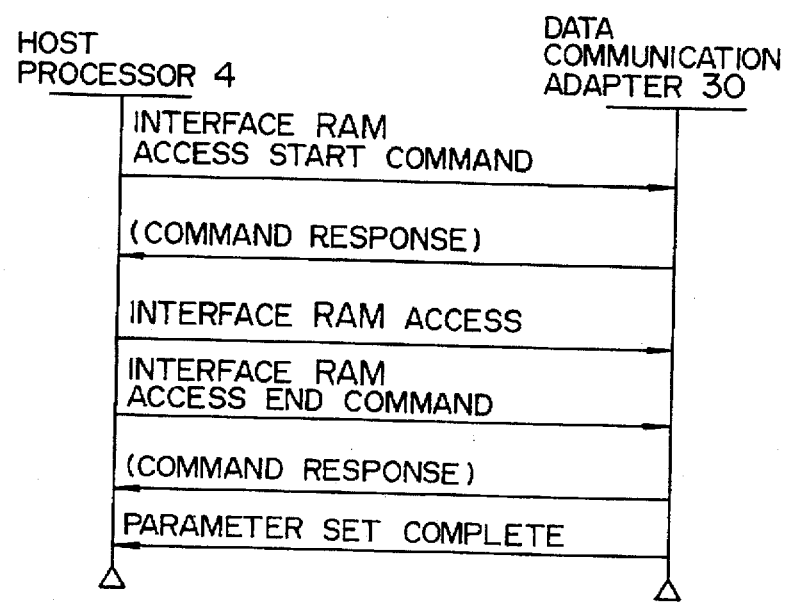

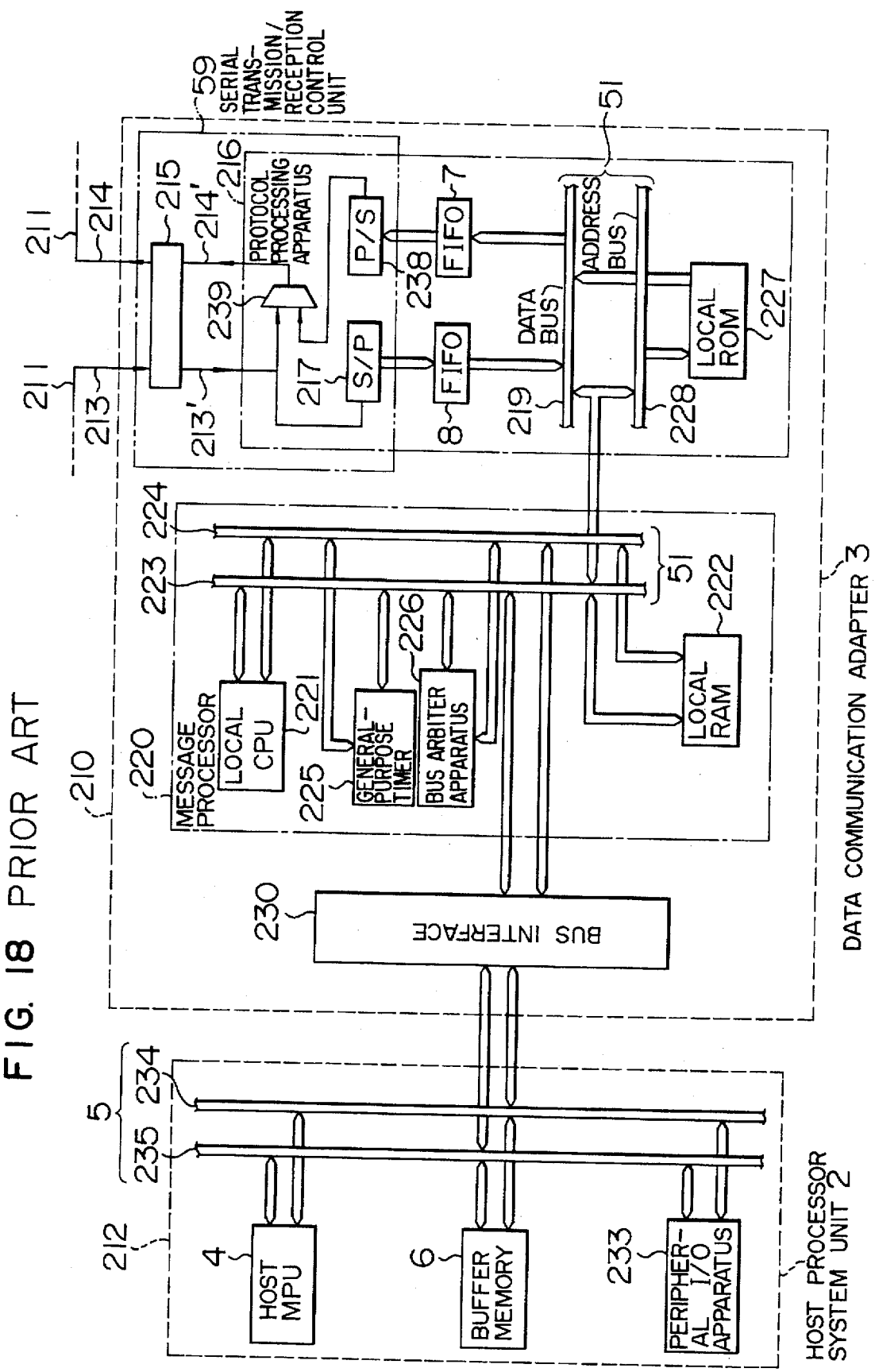

1

DATA COMMUNICATION ADAPTER AND DATA COMMUNICATION TERMINAL APPARATUS FOR PERFORMING DATA TRANSMISSION AND RECEPTION BETWEEN TERMINALS

This application is a continuation of application Ser. No. 07/544,674 filed Jun. 27, 1990, now abandoned.

BACKGROUND OF THE INVENTION

The present invention generally relates to a digital data communication apparatus in a data communication system. More specifically, the present invention is directed to a data communication adapter and also a data communication terminal apparatus for suitably performing a data transmission and reception via a communication transmission path between the terminals and work stations.

In FIG. 14, there is shown a data communication system in a token-ring LAN (Local Area Network) system, which is constructed of a signal transmission path 1, and a plurality of data communication terminal apparatuses. Each data communication terminal apparatus includes a host processor system unit 2 and a data communication adapter 3. The host processor system unit 2 includes therein a host processor 4, a buffer memory 6 for storing transmit/receive data, and also a system data/address bus 5 functioning as a transfer medium of the transmit/receive data between the data communication adapter 3 and itself. The data communication adapter 3 contains therein a receiving FIFO memory 7 for temporarily storing receive data 9 and 10 when the data received via the signal transmission path 1 passes through the data communication adapter 3 and then is stored in the buffer memory 6, and a transmitting FIFO memory 8 for temporarily storing the transmit data which passes from the buffer memory 6 via the data communication adapter 3 and is transmitted to the signal transmission path 1.

The reason why both the receiving FIFO memory 7 and transmitting FIFO memory 8 is provided is as follows. The receiving FIFO memory 7 is employed so as to maintain a response time of the host processor while receiving frame data from a serial transmit/receive control unit, and also temporarily store frame data subsequent to certain frame data which is under process by the data communication adapter.

The transmitting FIFO memory 8 is employed for buffering the data transfer velocities of the signal transmission path 1 and system data/address bus 5. In other words, the transmitting FIFO memory 8 has such a function to buffer the frame transmission velocity and also the transfer speed of the data from the buffer memory 6 to the transmitting FIFO memory 8.

FIG. 15 represents a positioning of the above-described data communication terminal apparatus in an OSI (Open Systems Interconnection) reference model. An LLC (Logical Link Control) sub-layer in the data link layer performs the frame transmission/reception controls between the stations, such as setting and releasing the logical link, retransmit controlling of the frame, and flow controlling of the frame. A MAC (Medium Access Control) sub-layer has functions to control a medium access between the stations and also to detect a fault occurring in the transmission path. The data communication adapter mainly realizes the MAC sub-layer. The host processor unit realizes the LLC sub-layer.

FIG. 16 illustrates an example of a construction of a single station. It should be noted that the same reference numerals shown in the previous figures are employed to indicate the same or similar circuit elements of FIG. 16. This station is constructed of the host processor 4, the buffer memory 6, the data communication adapter 3, a serial interface apparatus SI, a trunk coupling unit "TCU" and the communication transmission path 1. The serial interface apparatus SI performs synchronization of transmit/receive clocks, a detection of a signal, a correction of an amplitude, and a detection of a failure occurring in a communication path. The trunk coupling unit TCU corresponds to a relay apparatus for inserting the station into the communication path and for bypassing the station therefrom. The signal "SD" is constituted by, for instance, an SI control signal such as transmit/receive data, a receive clock, a self-oscillated clock and an insert/bypass instruction signal. It should be noted that both the serial interface apparatus SI and trunk coupling unit TCU are omitted from FIG. 14.

The data communication adapter is so arranged as to satisfy the international standard protocol.

The international standardized protocol is described in, for instance, International Organization for Standardization ISO/TC 97/SC 6 N4477, 1987-02-12 and ISO/TC 97/SC 6 N4488, 1987-01-01, and also Local Area Networks Token-Ring Media Access Method and Physical Layer Specifications, Common Reference Document CIRCA, November, 1988, pages 1 to 30.

FIGS. 17A and 17B represents an example of formats of data 9 and 10 flowing through the signal transmission path 1. In a token-ring LAN system, there are two different types of data called as a "token". That is to say, there exist data 26 (see FIG. 17B) functioning as a control medium for arbitrating among the respective stations as to a transmission right; and also data 20 (see FIG. 17A) containing normal information, called as a "frame". The frame 20 includes a start delimiter 21 representative of a frame head; a control field 22 indicative of a frame feature, e.g., a sort of the frame, a destination address, and an address of a transmit station; an end delimiter 24 indicating a trail of the frame; an end control field 25 containing such information whether or not there exists a destination address of the frame, and whether or not the frame has been copied by the destination address station; and, an information field 23. The token 26 is constructed of a start delimiter 27, a control bit 28 containing a priority bit and a reservation bit, and also an end delimiter 29.

More specifically, the arrangements of the host processor system unit and data communication adapter employed in the above-described data communication terminal apparatus are described in, for instance, U.S. Pat. Nos. 4,646,232 and 4,777,591. Then, a description will now be made of prior art.

FIG. 18 represents a conventional data communication terminal apparatus for a LAN system. An entire arrangement of this conventional data communication terminal apparatus is made of a host processor unit 2 and a data communication adapter 3. This data communication adapter 3 is constructed of a system interface 230, a message processor 220, and a protocol processing apparatus 216. The host processor system unit 2 is constructed of a host microprocessor unit (MPU) 4, a buffer memory 6, a peripheral I/O apparatus 233, a main address/data bus 234 for mutually connecting these circuit arrangements, and a control bus 235. These buses 234 and 235 constitute a system data bus 5.

On the other hand, the message processor 220 is arranged by a local CPU 221, a general-purpose timer 225, a bus arbiter apparatus 226, a local RAM 222, a local address/data bus 223 for mutually connecting these circuit arrangements, and a local control bus 224. These buses 223 and 224 constitute a local CPU dedicated address/data bus 51. A protocol processing apparatus 216 is arranged by a multiplexer 239, a serial/parallel converter (S/P converter) 217, a parallel/serial converter (P/S converter) 238, a transmit FIFO 7, a receive FIFO 8, an address bus 228, a data bus 219 and a local ROM 227. It should be noted that the buses 228 and 219 construct the above-described bus 51. Also, the S/P and P/S converters, multiplexer 239, and ring interface 215 constitute a serial transmission/reception control unit 59. It should be noted that reference numeral 215 shown in the station indicates a ring interface, and a received input signal 211 is converted into a voltage level for an internal process so as to reproduce a clock signal $\phi_s$ from a signal appearing in a communication loop.

Serial data (received data) inputted from a signal path 213 is converted into parallel data in the S/P converter 217. When the above-described serial data is to be copied, the inputted data byte is transferred by the FIFO buffer 8 to the data bus 219. The message processor 220 transfers the inputted data via the local address/data bus 223 and local control bus 224 to the local RAM 222 in accordance with the direct memory access (DMA). It should be noted that a program related to the local CPU 221 of the message processor 220 has been stored in a local ROM 227 and this local ROM 227 is accessed by the address bus 228 and data bus 219 extended from the local address/data bus 223. Subsequently, the input data which has been copied in the local RAM 222 is transferred via a system interface 230 into the buffer memory 6 within the host processor apparatus 212 by way of the DMA accessing method.

Data transmission of the conventional data communication terminal apparatus will now be described. The message frame stored in the buffer memory 6 is copied via the system interface 230 and local address/data bus 223 into the local RAM 222 in accordance with the DMA accessing method. When the protocol processing apparatus 216 confirms the reception of the free token, a controller employed in the protocol processing apparatus 216 commences the frame transmission from the local RAM 222 via the local address/data bus 223, data bus 219 and FIFO 7 in accordance with the DMA accessing method, the data derived from this FIFO 7 is converted into the corresponding serial data by the parallel-to-serial converter 238, and then conducted via the multiplexer 239 to an output line 214'.

As apparent from the above-described explanations, the conventional data communication terminal apparatus requires the bus arbiter 226 for arbitrating the exclusive right to use the bus 51 among the bus masters, since three bus masters such as the protocol processing apparatus 216, system interface 230, and local CPU 221 are connected to the commonly used CPU dedicated address/data bus 51 (both the local address/data buses 223, 224 and data bus 219, and also address bus 228).

That is to say, while one bus master executes the control with employment of the bus 51 in the conventional data communication terminal apparatus, there are some possibilities that another bus master having a further priority right makes a demand to use the bus 51. For instance, while the system interface 230 executes the control (e.g., the input message is DMA-transferred from the main memory 232 to the local RAM 222), the above-described problem may correspond to such a case that the protocol processing apparatus 216 establishes a demand to DMA-transfer the received data to the local RAM 222.

In such a case, it is required to arbitrate the use right on the bus 51 by means of the bus arbiter 226. In other words, the frame data (LLC frame data) produced and interpreted in the host processor system unit has been DMA-transferred among the buffer memory 6, transmission/reception FIFOs, and local RAM 222 via the bus 51, whereas the frame data (MAC frame data) produced and interpreted in the data communication adapter 3 has been DMA-transferred among the local CPU 221, transmission/reception FIFOs, and local RAM via the bus 51.

As previously described, since the bus 51 is dedicated when the data is transferred and also received in the conventional data communication terminal apparatus while the data is transferred among the transmission/reception FIFOs 7 and 8, local RAM 222, and buffer memory 6 so that other process operations are difficult to be performed, there is a trend that the process capabilities of the CPU employed in the data communication adapter, namely local CPU 221 are lowered. Moreover, when the control parameter and initial setting parameter are sent from the host processor system unit to this conventional data communication adapter, the bus 51 is being used thereby causing a deterioration in the process capabilities of the local CPU 221. In addition, the bus arbiter 226 is required and there is a further tendency to become complex in the control logic of the bus arbitration and also the time required for the bus arbitration when the bus master occupying the bus 51 is alternated by another one becomes an overhead time.

SUMMARY OF THE INVENTION

An object of the present invention is to provide a data communication adapter and a data communication terminal apparatus, which own the higher processing capabilities of the transmission/reception frames, and do not lower the processing capabilities of the CPU employed in the data communication adapter with respect to the reception frame to be interpreted by the host processor. Another object of the present invention is to provide a data communication adapter to which the host processor can easily access at a higher efficiency and which has a quick-response interface with the host processor.

Another object of the present invention is to provide a data communication adapter which is easily accessible from the host processor at a higher efficiency, and includes an interface unit capable of quickly reporting from the data communication adapter to the host processor.

A further object of the present invention is to realize a data communication adapter and a data communication terminal apparatus having high reliability by employing a frame status reporting unit and a parity check function unit.

A still further object of the present invention is to provide a data communication adapter and a data communication terminal apparatus, which realize a general-purpose interface in conjunction with the host processor, and are suitable for being manufactured in a semiconductor integrated circuit device (LSI).

To achieve the above-described objects, in accordance with the present invention, the data communication adapter and data communication terminal apparatus are so constructed that an internal host bus is newly employed in the data communication apparatus independent of the employment of a CPU dedicated bus, and the transmission/reception data generated and interpreted by the host processor is transferred via an internal host bus, a bus interface, and a system data bus between a transmission memory or a reception memory and a buffer memory.

Furthermore, the present invention is provided with a reception memory (host dedicated reception memory) for storing only the reception data to be interpreted by the host processor and is separately provided with another reception memory (CPU dedicated reception memory) for storing only the reception data to be interpreted by the CPU. Reception data to be interpreted by the CPU is transferred from the transmission/reception control unit to the CPU dedicated memory and thereafter read out via the CPU dedicated bus under the control of the CPU. Reception data to be interpreted by the host processor is stored in the host dedicated reception memory and then read out via the internal host bus and bus interface under the control of the host processor.

In addition, the present invention is so constructed that the CPU dedicated bus is separated from the system bus, the data transmission and reception is carried out via the bus interface and CPU dedicated bus between the host processor and data communication adapter, and a repeating unit (register) capable of accessing the adapter from the host processor is employed.

As a result, while processing the data by the host processor and transmitting/receiving the frame, the practical operation workload by the CPU can be suppressed to its minimum value. In other words, since the occupancy rate of the CPU dedicated bus for the above-described frame processing operations can be suppressed to a lower value, it can prevent the lowering of the processing capability of the CPU which controls the MAC layer.

Moreover, as there is employed only the CPU apparatus as the bus master on the CPU dedicated bus, no bus arbiter is required, no complex control is required and the data transfer efficiency becomes high.

Further, the data can be transmitted and received via the bus interface and CPU dedicated bus between the host processor and data communication adapter, and alternatively a repeating unit capable of accessing the communication adaptor and the host processor may be used.

To establish a high reliability with respect to the received data, in the data communication adapter according to the present invention, there are provided:

a unit for generating a parity bit and adding the parity bit to the received data in the transmission/reception control unit;

a unit for performing a parity check with respect to the received data which has been read from the host dedicated reception memory and inputted via the internal host bus, and also added with the parity bit in the bus interface; and, another unit for executing a parity check with respect to the received data which has been read out from the CPU dedicated memory, inputted via the CPU dedicated bus and added with the parity bit in the data communication adapter.

Similarly, to achieve the high reliability on the transmitted data, the data communication adapter according to the present invention comprises: means for adding a parity bit to the frame data which has been generated by the CPU and inputted into the transmissions memory; means for executing a parity check with respect to the frame data to which the parity bit derived from the host processor unit has been added, and for inputting the frame data via the internal host bus into the transmitting memory; and, also means for performing a parity check with respect to the transmit data which has been read from the transmitting memory.

Furthermore, to achieve the quick report on the frame status to the host processor and CPU, the data communication adapter according to the present invention further comprises:

a unit for producing a first frame status interpreted by the CPU based upon said first frame data among the receive data which have been received by the transmission/reception control unit, and also for producing a second frame status interpreted by the host processor based upon the second frame data;

a unit for storing the first frame status together with the first frame data into the CPU dedicated receiving memory; and, a unit for transferring the second frame status together with the second frame data via the host dedicated receiving memory, internal bus means and bus interface to the host processor unit.

As a consequence, both the host processor and CPU can firmly and rapidly grasp the conditions of occurrences of the errors and reasons thereof, whereby they can properly execute the processing operations.

BRIEF DESCRIPTION OF THE DRAWINGS

FIGS. 8A and 8B illustrate one example of transmission/reception frame statuses;

FIG. 10 is a schematic block diagram of one example of a major construction of a data communication adapter for transmitting/receiving data and commands via the system interface RAM;

FIG. 11 represents an operation flow for explaining the operation of the data communication adapter shown in FIG. 10;

DESCRIPTION OF THE PREFERRED EMBODIMENTS

Referring now to the accompanying drawings, a data communication adapter and data communication terminal apparatus according to various preferred embodiments of the present invention will be described.

Figure 1A:
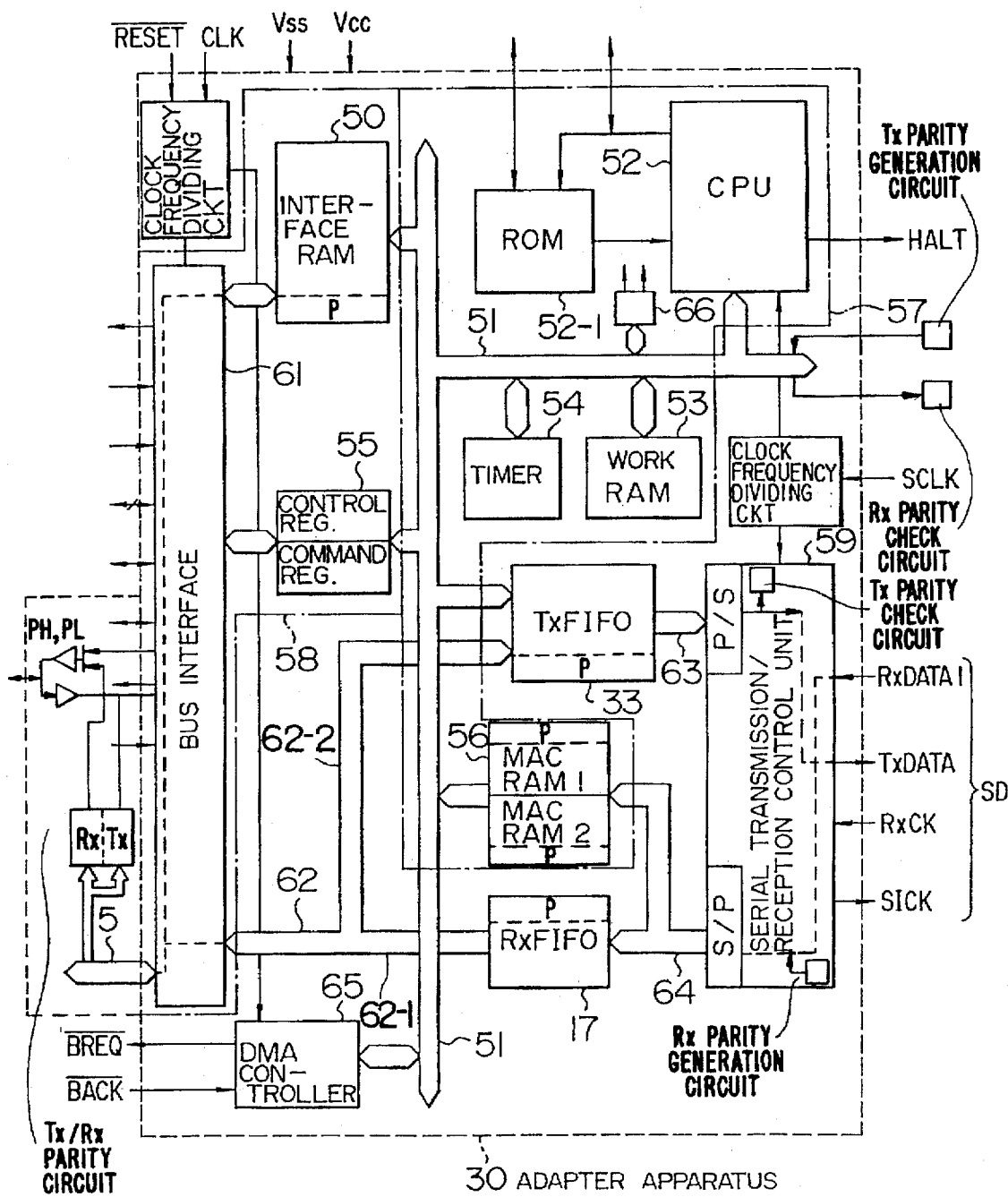
FIG. 1A is a schematic block diagram of an arrangement of a data communication adapter according to one preferred embodiment of the present invention.
Figure 2A:
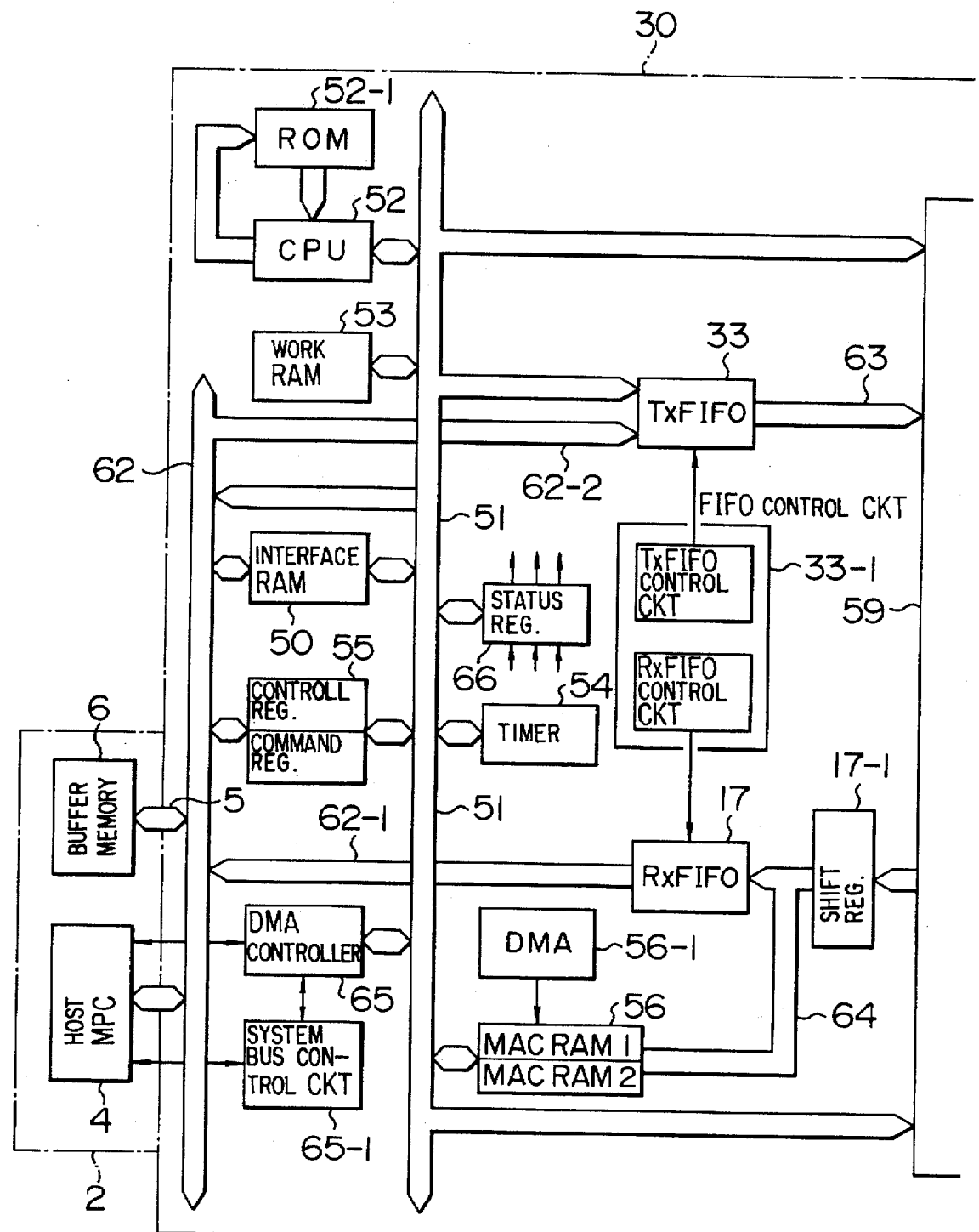
FIG. 2A is a schematic block diagram of an arrangement of a data communication terminal apparatus according to one preferred embodiment of the present invention.

In FIG. 1A, there is shown an arrangement of a data communication adapter according to one preferred embodiment of the present invention. In FIG. 2A, there is shown an arrangement of a digital data communication terminal apparatus employing the data communication adapter represented in FIG. 1A, according to a preferred embodiment of the present invention. It should be noted that although in the digital data communication terminal apparatus shown in FIG. 2A, both the bus interface 61 and frequency divider circuit shown in FIG. 1A are omitted, the data communication adapter represented in FIG. 2A has the essentially same arrangement as that of the data communication adapter indicated by FIG. 1A. It should be also noted that the same reference numerals shown in the previously explained examples will be employed as those for denoting the same or similar circuit elements shown in the following figures. This principal will be adapted to the following preferred embodiments. The digital data communication terminal apparatus, shown in FIG. 2A, includes a host processor system 2 having a data processing apparatus, for example, a host processor 4 and a memory, for instance, a buffer memory 6; and also a data communication adapter 30.

A dedicated (special-purpose) processor unit is constructed of: a data processing apparatus, e.g., a central processing unit (CPU) 52; a memory for storing a microprogram used to control this CPU 52, for instance, a read-only memory (ROM) 52-1; another memory, e.g., a work random access memory (work RAM) 53; a memory for storing reception frame data interpreted in the data communication adapter, for example RAM (reception MAC RAM) 56; a control/status register 66; a timer 54; and a CPU dedicated data/address bus 51 for read/write-accessing the above-describe RAM, register and the likes in the CPU. The MAC RAM 56 includes two sets of MAC RAMs, namely MAC RAM 0 and MAC RAM 1.

A system interface unit includes the CPU dedicated data/address bus 51; a system data/address bus 5; a bus interface 61 (not shown in FIG. 2); a control/command memory, e.g., register 55; and an interface memory, e.g., RAM 50.

A transmission parallel data processing apparatus is constituted by a transmission FIFO (TxFIFO) 33; a FIFO control circuit 33-1; and a DMA control circuit for transferring the transmission data stored in the buffer memory 6 via a system data/address bus 5 and internal host data buses 62 and 62-2 to the transmission FIFO 33.

A reception parallel data processing unit includes a DMA control circuit 65 for transferring the outputs derived from a reception LLC frame memory such as a FIFO (RxFIFO) 17 via the internal host data bus 62, 62-1 and system data bus 5 to the buffer memory 6; a FIFO control circuit 33-1, a shift register 17-1; the reception FIFO 17; and a DMA circuit 56-1 for transferring the outputs of the shift register 17-1 to a reception MAC RAM 56.

A serial transmission/reception control unit 59 handles serial transmission/reception data, and other functions: modulation/demodulation of the transmission/reception data; an address check; a token control; a generation and check of FCS (Frame Check Sequence); a detection/recovery of a failure occurring in a Physical (PHY) layer. The physical layer supports the level conversion, waveform shaping, synchronization, detection of line abnormality, etc. of a line data signal.

The data communication adapter 30 is constructed of the above-described system interface unit, transmission parallel data processing unit, reception parallel data processing unit, and serial transmission control unit 59.

Next, an operation of the above-described data communication adapter and digital data communication terminal apparatus will now be described. There are two types of frames: one frame generated and interpreted by the host MPU 4 (referred to as an "LLC frame") and the other frame generated and interpreted by the data communication adapter 3 (referred to as an "MAC frame"). When the LLC frame is transmitted, the host processor 4, first of all, writes a transmission initializing command into the control/command register 55, whereby the CPU 52 performs the transmission procedure. The transmission LLC frame data is DMA-transferred from the buffer memory 6 via the system address/data bus 5, and internal host data bus 62 to the transmission FIFO 33, and furthermore is outputted via the serial transmission/reception control unit 59 to the communication transmission path 1. The transmission of the MCA frame is so executed that the CPU apparatus 52 writes the transmission data via the CPU dedicated data bus 51 into the transmission FIFO 33 under the control of the microprogram. It should be noted that the transmission FIFO 33 is used for temporarily storing both the input data and communication transmission path output data (transmission frame) for a transfer velocity buffering purpose.

The transmission FIFO 33 is constructed of, for instance, a temporary register; a FIFO memory; a serial unit interface; and a CPU interface unit, and the above-described transmission data is written into this temporary register. To announce a starting point and an ending point of the frame data to the transmission FIFO, both a starting bit and an ending bit are written together with the transmission frame data into this temporary register.

The reception LLC frame data is DMA-transferred from the reception FIFO 17 via the system data bus 5 and internal host data bus 62 to the buffer memory 6. The reception MAC frame data is DMA-transferred to one of two sets of the reception MAC RAMs 56 (MAC RAM 0 and MAC RAM 1) by the DMA control circuit 56-1 after passing through the shift register 17-1. After the reception MAC frame data has been transferred to the reception MAC RAM 56, this completion of the above-described transfer operation of the reception MAC frame data is reported to the CPU 52 by an interrupter means (not shown). Then, this CPU 52 reads the reception MAC RAM 56 via the CPU dedicated data/address bus 51.

As apparent from the above-described construction, the status and parameter are transmitted/received between the host processor system unit and CPU 52 via the interface RAM 50. As a consequence, it is a mutual accessible. The data communication adapter 3 is accessed and controlled by the host processor system unit via the control/command register 55. Thus, the CPU dedicated data/address bus 51 is separated from the system data/address bus 5.

Consequently, since the data transmission/reception is carried out via the interface RAM 50 and command/control register 55 between the host processor and CPU apparatus 52, it can prevent lowering the bus occupying ratio of the CPU 52.

Furthermore, it is so arranged that the frame data (LLC frame data) generated and interpreted by the host processor system is DMA-transferred via the internal host bus 62 which has been separately employed from the bus 51, and buffer memory 6 between the transmission/reception FIFOs 17 and 33. Also, it is so constructed that the frame data (MAC frame) to be generated and interpreted by the data communication adapter 3 (CPU apparatus 52) is transferred from the CPU 52 via the CPU dedicated data/address bus 51 in case of the data transmission, and the output of the reception FIFO 17 is DMA-transferred via the dedicated bus 64 to the reception MAC RAM in case of the data reception (otherwise the reception data obtained at the output side of the shift register 17-1).

Accordingly, since the operations occupied by the CPU 52 can be suppressed to a minimum while processing the data in the host processor system unit and transmitting/receiving the LLC frame, the original processing capability of the CPU 52, i.e., a control of the MAC layer is not lowered. In other words, since the occupying ratio of the CPU dedicated bus 51 for the frame processing operation can be reduced to a small value, the original processing capability of the CPU 52 is not lowest. Furthermore, since the bus master on the CPU dedicated bus 51 is only the CPU 52, the CPU dedicated bus 51 does not require the bus arbiter. Thus no complex control is needed and also the data transfer efficiency becomes high.

In addition, since the support function of the MAC layer is mutually independent from that of the LLC layer, the data communication adapter according to the preferred embodiment can realize the general-purpose interface with the host processor.

Figure 1B:
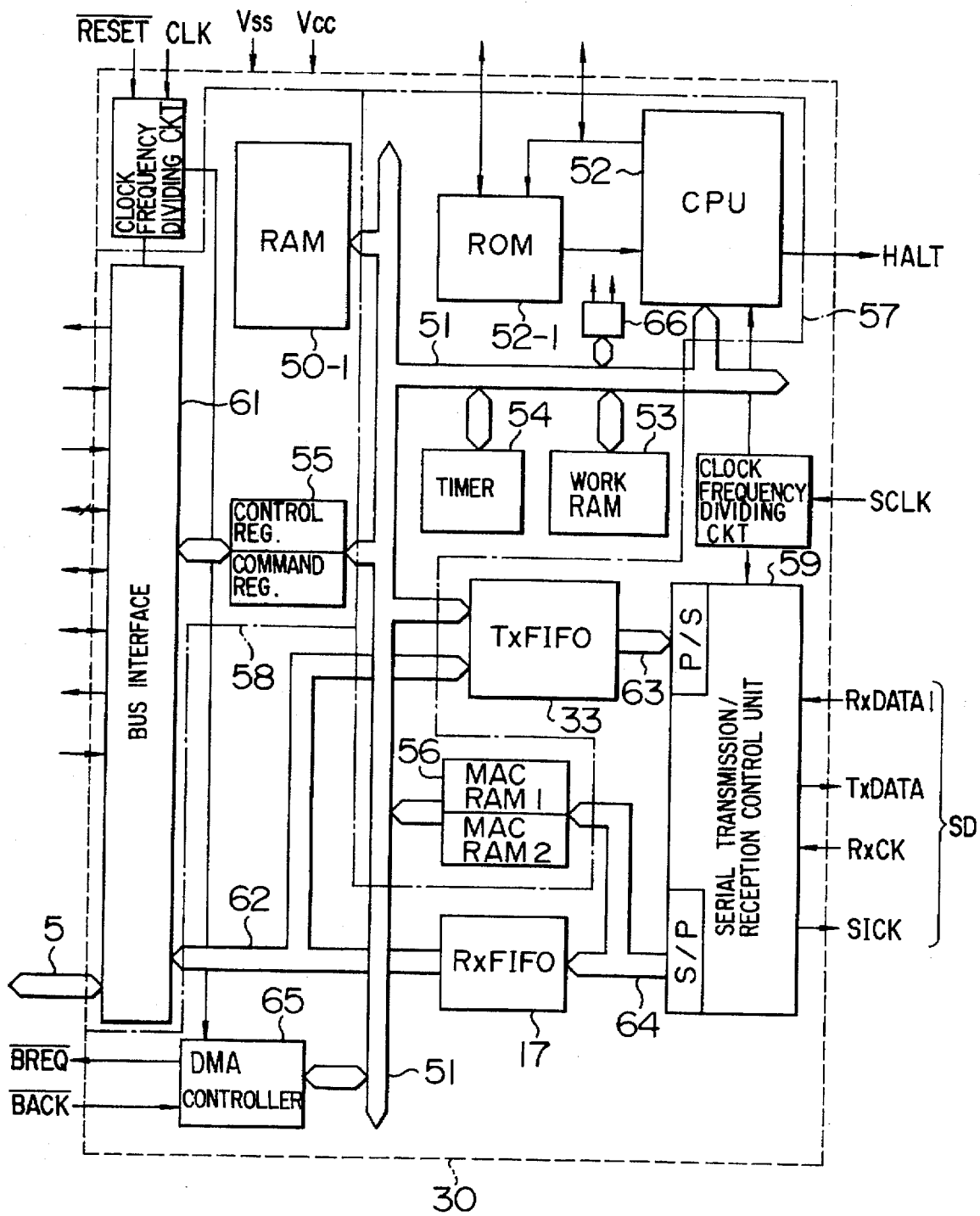
FIG. 1B is a schematic block diagram of a modification of the data communication adapter shown in FIG. 1A.

It should be noted that as represented in FIG. 1B, the bus between the interface RAM 50 and interface 61 is deleted from the circuit arrangement shown in FIG. 1A, the interface RAM 50 is employed as a RAM 50-1, and the data transmission/reception may be performed via a bus 51 under this RAM 50-1.

In accordance with this preferred embodiment, as represented in FIG. 2A, the reception FIFO unit is constructed of the reception FIFO 17 and shift register 1401, and both a time period during which a judgement is made whether the reception frame should be transferred to the buffer memory 6, or to the reception MAC RAM 56 while transferring this reception data to the shift register 17-1, and another time period during which the frame status is generated (by the serial transmission/reception control unit 59) can be maintained. As a result, since the reception data is inputted to the FIFO 17 after the above-described judgement and generation of the frame status, the FIFO control becomes simple. Also, as there are employed two MAC RAMs, there is a particular advantage that two sets of the reception MAC frames can be continuously received and the higher processing capability for the reception frame can be achieved.

In addition, since the CPU 52 is operated with ROM 52-1 under microprogram control, and the standard interface with the various host processors is, this data communication adapter 3 may be formed in a semiconductor integrated circuit apparatus (LSI).

As apparent from the foregoings, the reception FIFO unit need not include the shift register 17-1, but may be constructed of only the normal FIFO memory 17. In this case, a selection transmitting unit for selectively transmitting the output from the reception FIFO to the internal host bus or CPU dedicated bus is required.

Figure 2B:
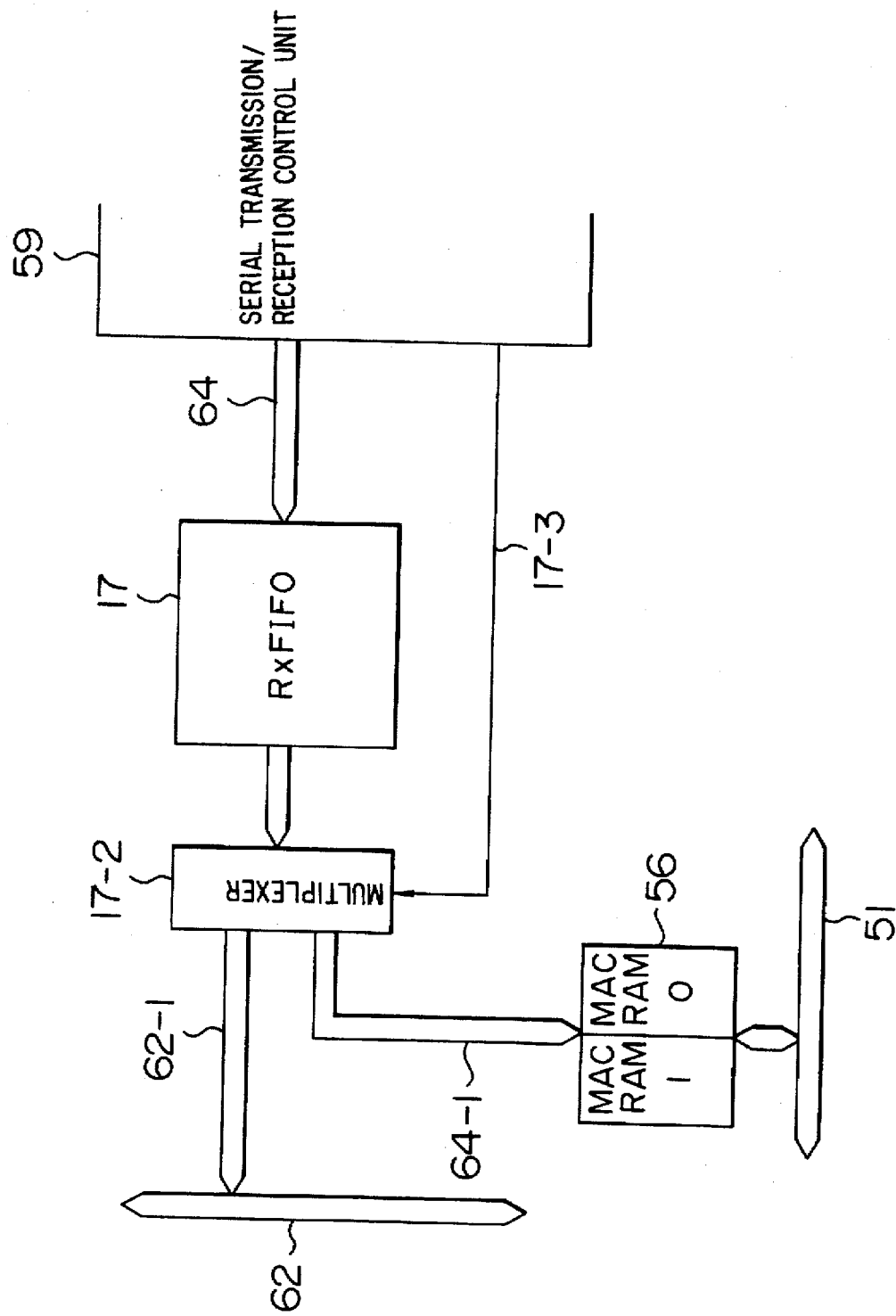
FIG. 2B is a schematic block diagram of a major circuit portion for a modification of the data communication terminal apparatus shown in FIG. 2A.

FIG. 2B illustrates the major elements of the data communication adapter 30, in which the selection transmitting unit, for instance, a multiplexer 17-2 is employed, and then a bus selecting signal 17-3 for this multiplexer 17-2 is produced by the serial transmission/reception control 59. The bus selecting signal 17-3 is formed by decoding the data on the control field for the reception frame.

The data outputted from the reception FIFO 17 is transferred via the multiplexer 17-2 to the internal host bus 62-1, or via the dedicated bus 64-2 to the MAC RAM 56. The output data of the multiplexer is transferred to the internal host bus 62-1 side when the bus selecting signal 17-3 becomes an "H" level (when the reception frame corresponds to an external system process frame), and is transferred to the dedicated bus 64-1 side when the bus selecting signal becomes an "L" level (when the reception frame corresponds to an internal system process frame).

Figure 3:
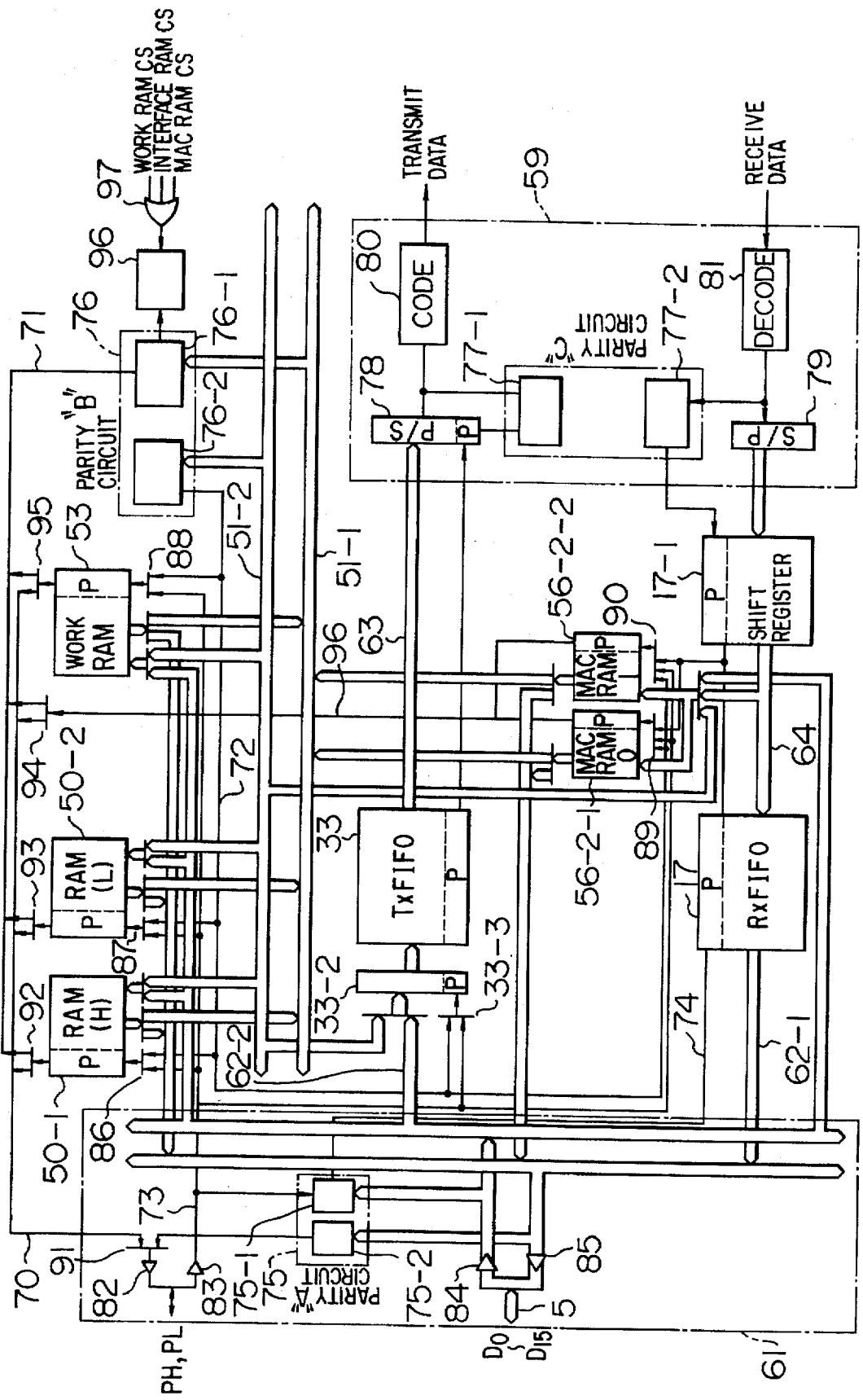
FIG. 3 is a schematic block diagram of a data communication adapter including a parity check function according to one example of the present invention.

Then, in FIG. 3, there is shown a data communication adapter in which a parity check function has been added to the preferred embodiment shown in FIG. 2A, according to another preferred embodiment of the present invention. Since the basic arrangement shown in FIG. 3 is the same as that of FIG. 2A, a circuit portion having no direct relationship with the major feature of this preferred embodiment is omitted, and also a circuit portion different from the above-described preferred embodiment will now be mainly explained.

In accordance with this preferred embodiment, there are provided two system interface RAMs 50-1 and 50-2 for each storing data at a high bit side, or at a low bit side, and also a transmission FIFO unit constructed of a transmission FIFO 33 and temporary register 33-1. Furthermore, there are newly employed parity circuits 75 to 77 including parity bit generating circuits and parity bit checking circuits; a P/S (parallel-to-serial) converting circuit 78; a S/P (serial-to-parallel) converting circuit 79; an encoding circuit 80; a decoding circuit 81; selector circuits 86 to 95; input buffers 83, 84; and also output buffers 82, 85. It should be noted that a symbol "P" indicates a parity bit. The parity bit which has been added to the frame is stored into each of the register 17-1, FIFO 17, MAC RAM 56, FIFO 33, register 33-1 and RAMs 50, 53.

In this preferred embodiment, the CPU dedicated data bus 51 is arranged by a CPU read data bus 51-1 and a CPU write data bus 51-2, whereas the internal host data bus 62 is similarly constructed of a host read data bus 62-1 and a host data bus 62-2. As apparent from the below-mentioned descriptions, the subject matter of the present invention may also be applied to the read write common bus (i.e., common bus) system.

The parity check function may be realized with the following construction.

That is to say, both the data parity check circuit 76-1 of the CPU read data bus 51-1 and the data parity generating circuit 76-2 of the CPU write data bus 51-2 is represented by a parity generating circuit 75-2 of the internal host read data bus 62-1 and the data parity check circuit 75-1 of the internal host write data bus 62-2 is indicated by a parity "A" circuit 75; and both the internal transmit data parity check circuit 77-1 and internal receive data parity check circuit 77-2 are denoted by a parity "C" circuit 77. The LLC transmit data containing the parity bit which has been added in the host processor system unit 2 is parity-checked by the parity check circuit 75-1 of the parity "A" circuit 75, and thereafter is further parity-checked via the FIFO 33 by the parity check circuit 77-1 of the parity "C" circuit 77 in the output side (or input side) of the P/S converting circuit 78. The MAC transmit data is written via the selector 33-3 into the temporary register 33-2 together with the parity bit 72 generated in the parity bit generating circuit of the parity "B" circuit 76. Then, after this MAC transmit data has passed through the temporary register 33-2 and transmit FIFO 33, it is similarly parity-checked in the parity check circuit of the parity "C" circuit 77.

The parity bit for the LLC reception data is generated by the parity generating circuit 77-2 of the parity "C" circuit and added to the reception data at the input side of the S/P converting circuit 79. The reception data is inputted via the shift register 17-1 to the reception FIFO 17 and the parity bit thereof is applied to the parity check circuit of the parity "A" circuit 75 via the signal path 74 for the parity check operation. The reception data appearing on the host bus 62-1 is inputted via the input buffer 84 to the parity check circuit 75-1 of the parity "A" circuit 75. After the reception MAC frame data and parity bit which has been similarly produced have been stored in the reception MAC RAMs 0 56-2-1 and MAC RAM 1 56-2-2, when they are read under the control of CPU, they are inputted via the CPU read bus 51-1 and signal path 96 to the parity check circuit 76-1 of the parity "B" circuit 76 for the parity check operation.

Subsequently, a description will now be made of the parity check operation which is performed while accessing RAM employed in the data communication adapter and register from the system bus 5. It should be noted that for the sake of simplicity, a data bus is simply referred to as a "bus".

The write data "$D_0$" to "$D_{15}$" supplied from the system bus 5, and the parity bits "PH" and "PL" of the upper byte data and low byte data are inputted via the corresponding input buffers 84 and 83, are parity-checked in the parity check circuit 75-1 of the parity "A" circuit 75, and thereafter written into the system interface RAMs 50-1, 50-2, or work RAM 53, MAC RAMs 56-2-1 and 56-2-2. It should be noted that the work RAM 53, MAC RAMs 56-2-1 and 56-2-2 are not necessarily written under the host MPU and may be merely writable for diagnosing the data communication adapter in this preferred embodiment. During the reading operation by the host MPU, the parity bit which has been stored in the above-described RAM is outputted via the signal path 70, selector circuit 91 and output buffer 82 as the signal PH and PL at the same timings with the read data "$D_0$" to "$D_{15}$".

In case of the LLC reception frame data, a parity bit is newly produced in the parity generating circuit 75-2 of the parity "A" circuit 75, and outputted as a PH signal and a PL signal. It should be understood that "PH" and "PL" correspond to parity bit signals at the high byte data side and low byte data side, and are generated at the host processor side or with the communication adapter.

Reference numeral 96 indicates a status generating circuit for setting a cause when a parity error occurs, and reference numeral 97 indicates an OR gate. A status in this preferred embodiment is set by an OR logic output of a chip select (CS) signal which is produced when the internal RAM is accessed by the host processor. The error cause inputted into the status generating circuit contains those from the parity "A" circuit 75 and parity "C" circuit 77 (not shown).

Figure 4:
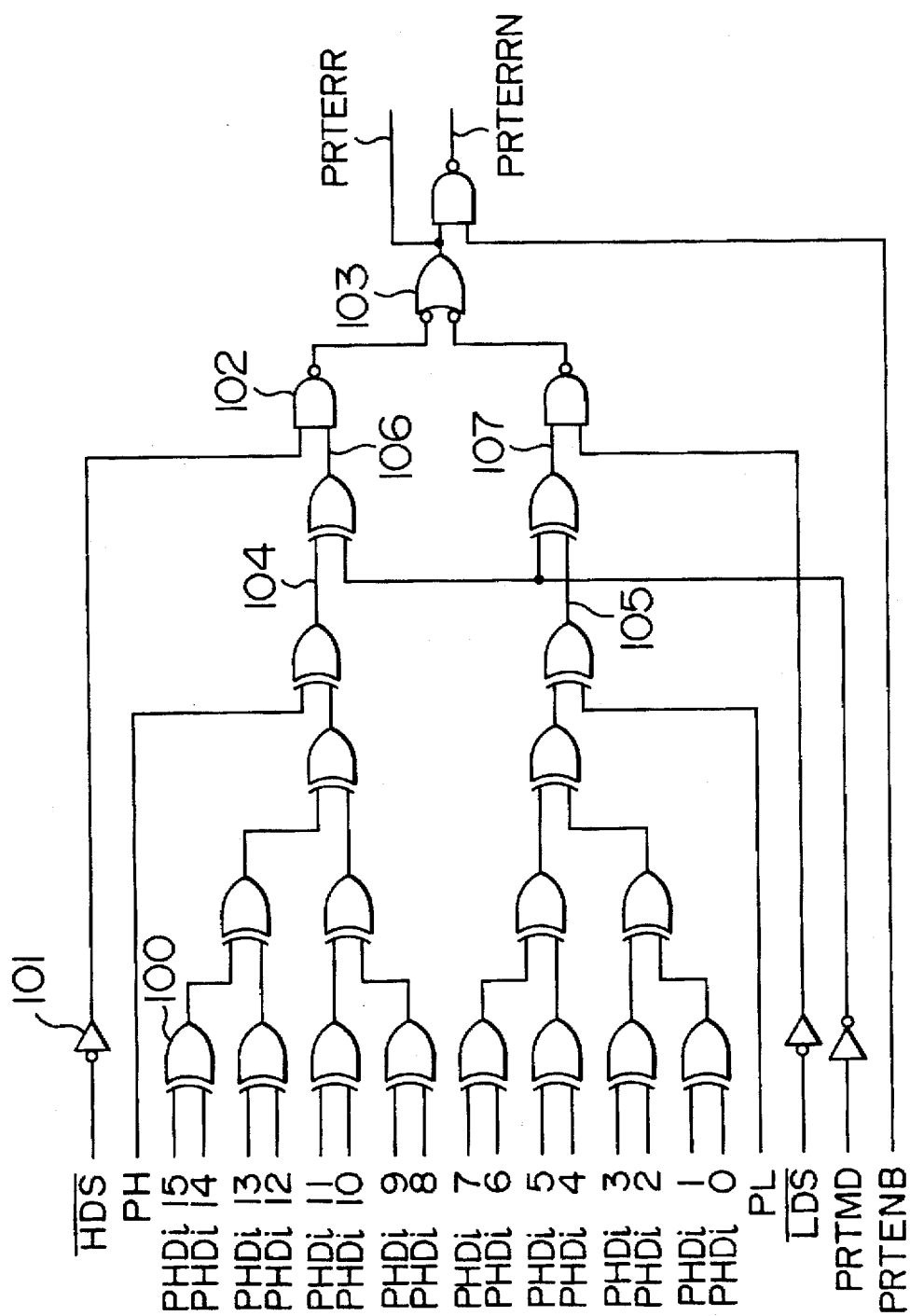
FIG. 4 is a schematic block diagram for representing an arrangement of one example of the parity check circuit shown in FIG. 3.

FIG. 4 represents an example of the parity check circuit 75-1. This check circuit outputs "1" when inputs are coincident, and "0" when the inputs are noncoincident. This parity check circuit 75-1 is constructed of an exclusive-OR gate 100, 2-input NAND gates 102 and 103, and an inverter gate 101. Parity check results between high byte data PHDi 15-8 (i.e., data on the internal host write bus 62-2) and RH, and also between low byte data PHDi 7-0 (ditto) and PL appear on the respective nodes 104 and 105. That is to say, in 9-bit data containing a parity bit, this data becomes "1" when an even parity is satisfied and "0" when an odd parity is satisfied. Signals appearing at nodes 106 and 107 become "1" both during an even parity error when the parity mode signal PRTMD="1" (EVEN parity mode), and during an odd parity error when the parity mode signal PRTMD="0" (ODD parity mode). Parity error signals PRTERR and PRTERRN are outputted at a timing of "0" for data strobe signals $\overline{HDs}$ and $\overline{LDs}$. It should be noted that the parity error signal PRTERRN becomes enable/disable in response to a logical value of a parity enable signal PRTENB.

In accordance with this preferred embodiment, since the parity enable/disable mode and ODD/EVEN parity mode may be arbitrarily set by outputting the PRTENB signal and PRTMD signal as the outputs of the registers accessible by the host MPU, the data communication adapter is useful for a general purpose and may be readily manufactured in an LSI chip.

Figure 5:
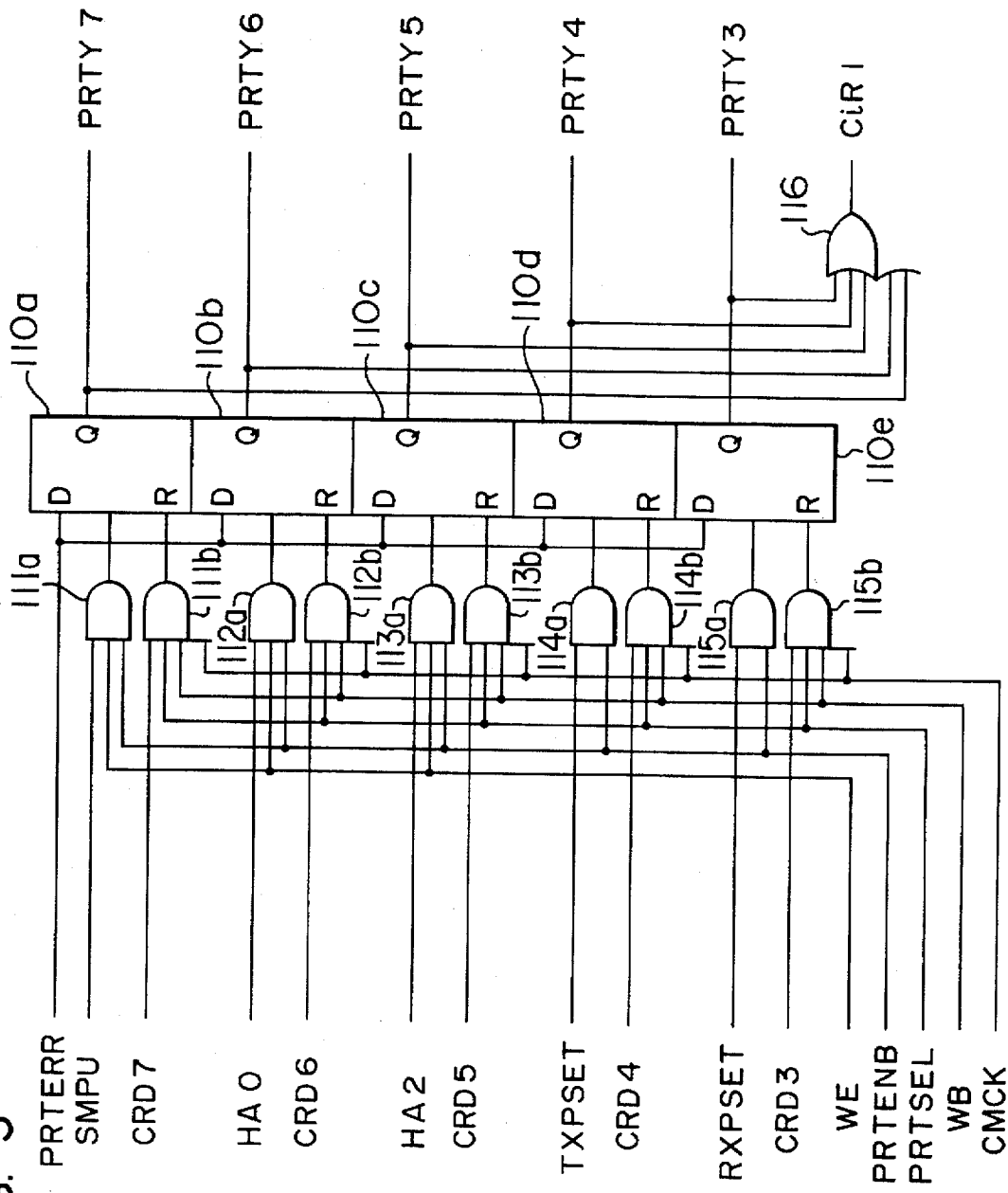
FIG. 5 is a schematic block diagram for indicating an arrangement of one example of the parity register shown in FIG. 3.

FIG. 5 represents one preferred embodiment of a status generating circuit (parity error register). This status generating circuit is arranged by D type latch circuits 110a to 110e, AND gates 111a to 115a, 111b to 115b and an OR gate 116.

PRTERR corresponds to OR gating outputs of various parity error causes. Both a host write enable signal WE and PRETNB signal are commonly supplied to inputs of the AND gates 111a to 113a. Also, to the above-described three AND gates, a CS signal SMPU of the system interface RAM 50, a CS signal HA0 of a command register 55, and a CS signal HA2 of a control register 55 are connected. When a parity error occurs (PRTERR="1") while the host MPU 4 accesses one of the above-described RAM 50 and register 55, the latch circuit corresponding to one of the above-described RAM and register which have been chip selected is set, and therefore any one of the corresponding parity statuses PRTY 5 to 7 become "1". When PRENB=i, the AND gates 114a and 115a cause the PRTERR signal to be latched in the latch circuits 110d and 110e at the timing when the transmission DMA parity error set signal TXPSET="1", and also the reception DMA parity error set signal RXPSET="1". A logic output CiR1 of the OR gate 116 with respect to the parity error statuses PRTY 3 to 7 becomes an interruption signal for the CPU 52. If this CPU 52 reads this parity error register after accepting the interruption, it can detect where a parity error occurs. This is very useful for analyzing and processing an error when an extraordinary case happens to occur. In particular, this status is reported to the host processor system unit, so that the recovery procedures for this failure case may be asked for this host processor system unit ("parity report" will be discussed later). It should be noted that the resetting operation of the above-described latch circuit is carried out by writing "1" from the CPU 52 via the data CRD 3 to 7 of the CPU write bus. PRTSEL, WB, and CMCK correspond to the CS signal of the parity error register, write enable signal thereof, and write strobe signal thereof, respectively, and also are generated within the adapter 30.

Figure 6:
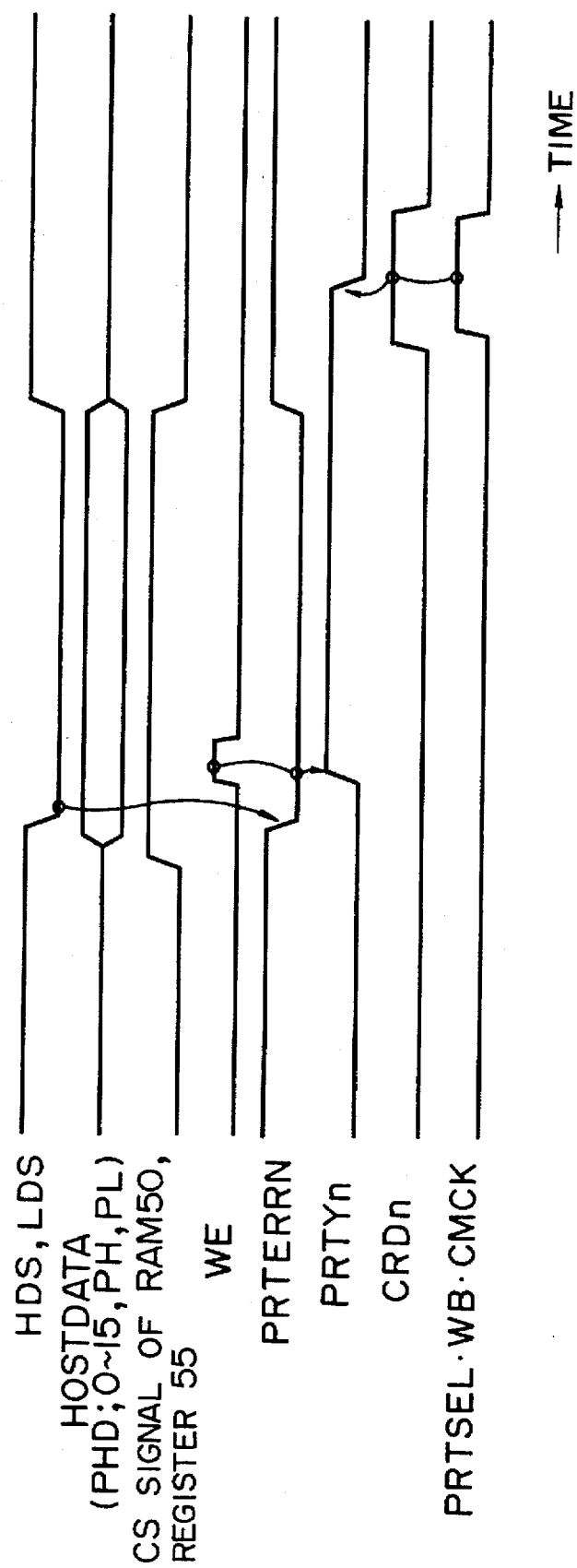
FIG. 6 represents a timing chart of signal waveforms for explaining an operation of the parity register shown in FIG. 5.

FIG. 6 represents a time chart of signals obtained when the above-described parity error register is set by the host MPU 4. During this timing, the data are written into both the control/command register 55 and RAM 50, and the write clocks for these register and RAM are formed in accordance with the logic of the WE and PRTERRN. When a parity error occurs, since PRTERRN="0", no write clock for the register is generated and thus the data is not written during the occurrence of the parity error.

Based upon the above-described explanation, it may be readily conceived such a preferred embodiment that the DMA transfer is stopped when a parity error occurs. As previously described, after the CPU 52 senses an interruption signal CiR1, the parity error register is read to detect whether a parity error has occurred during the DMA transfer (PRTY 3 or PRTY 4="1"). Thereafter, the CPU 52 writes a DMA stop command code via a CPU dedicated write bus 51-2 into a DMA control circuit 65, and this DMA control circuit 65 decodes this command code so as to stop the DMA operation.

As previously described, the parity check function is realized in such a way that the parity check circuit for the transmit data containing the transmit parity bits derived from the system bus 5 and CPU dedicated data bus 51 is employed on the output bus 63 of the transmit FIFO 33 within the bus interface 61 (internal host bus 62), the parity generating circuit for the reception data is employed on the reception data output bus 64 for the serial transmission/reception control unit 51, and also the reception parity check circuit is employed on the internal host bus 62. Also, there is employed the status register for setting the causes when the parity error happens to occur. When the parity error is detected by the parity check circuit, if the DMA is under transmission, the circuit for stopping this transmission is employed, and also the circuit for reporting the cause status of this parity error to the host processor 4 after this DMA transmission has been stopped, so that the higher reliability of the parity check function can be achieved.

Furthermore, there is also provided such a circuit for prohibiting data from being written into the above-described RAM and register during the detection of the parity error when the data containing the parity bit is written from the host processor system unit via the system bus 5 into these RAM 50 and register 55 employed in the data communication adapter 30. This could be simply realized by the output of the above-described status register.

Figure 7:
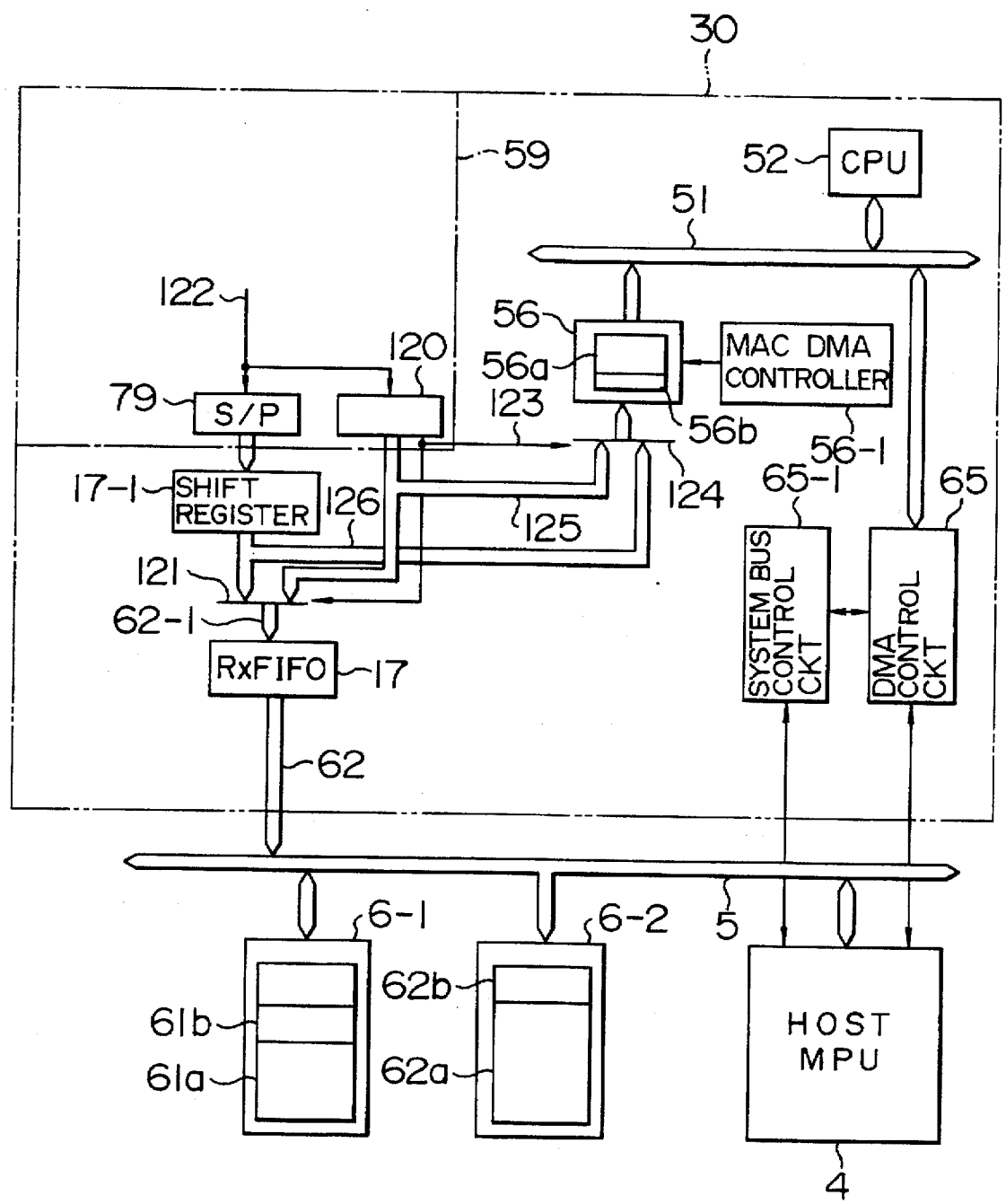
FIG. 7 is a schematic block diagram of a data communication terminal apparatus including a frame status transfer function according to one example of the present invention.

Then, in FIG. 7, there is shown one preferred embodiment of a digital data communication terminal apparatus capable of transferring a frame status.

In the digital data communication terminal apparatus shown in FIG. 7, reference numeral 4 indicates a host processor; reference numerals 6-1 and 6-2 are two buffer memory units for constituting a buffer memory 6; reference numeral 65 is a DMA control circuit; reference numeral 65-1 indicates a system bus control circuit; reference numeral 52 denotes a CPU; reference numeral 56 represents a reception MAC RAM; reference numeral 56-1 indicates an MAC DMA control circuit; reference numeral 17 represents a reception FIFO; reference numeral 17-1 indicates a shift register; reference numeral 79 represents a S/P converting circuit; reference numeral 120 represents a frame status generating circuit; and, reference numeral 59 indicates a serial transmission/reception control unit.

Next, an operation and function of the above-described digital data communication terminal apparatus will now be explained. Serial reception data 122 is inputted to the S/P converting circuit 79 and simultaneously inputted also to the status generating circuit 120. The status generating circuit 120 generates a status constructed of bits representative of a frame length, indicating whether or not a parity error and an FCS (Flame Check Sequence) error happen to occur, and also whether or not a destination address of a frame is coincident with a self-station address. The shift register 17-1 is used to temporarily store the received (reception) data for a time period during which these frame statuses are generated, or the frame copy is judged. The shift register 17-1 may be constructed of a FIFO memory. At a time instant where the reception data appears from the shift register 17-1 at the output-sided bus 126, both the generation of the frame status and the copy judgement have been accomplished. In case of the reception MAC frame data, the frame status appearing on the bus 125 and also the reception MAC frame data may be transferred to the MAC RAM 56 by switching the channel selector 124 in response to a frame field detection signal 123. Reference numeral 56a shown in the MAC RAM 56 indicates a storage area for reception frame data and reference numeral 56b represents another storage area for a reception frame status.

When receiving the LLC frame, after the reception data has been DMA-transferred to either the buffer memory 6-1 or 6-2 by switching the channel selector 121 in response to the frame field detection signal 123, the frame status is DMA-transferred to either the buffer memory 6-1 or 6-2 subsequent to such a DMA transfer. The frame status together with the reception frame data pass through the reception FIFO 17. A DMA transfer demand initializes a series of such operations that a DMA transfer starting command is produced via the CPU dedicated bus 51 in the DMA control circuit 65 under the control of the CPU 52, and a bus arbitration, a DMA transfer address, a read/write control signal and the like are generated. In the buffer memories 6-1 and 6-2, reference numerals 61a and 62a indicate reception frame data storage areas, and reference numerals 61b and 62b indicate frame status storage areas for the reception frame.

FIGS. 8A and 8B represent a preferred embodiment of constructions of the frame status. As represented in FIG. 8A, the transmission frame status corresponds to a status generated when the transmission frame is again returned to the self station after it has been circulated in the ring from the self station. Then, this transmission frame is arranged by the below-mentioned items:

(1) TRREX: TRR (Return to Request) time Expired.
(2) AC1, AC2: contents of an A bit after being circulated in a frame (address recognition bit), and also a C (copy) bit.
(3) TE1, TE2: a content of an E bit after being circulated in a frame (a bit indicating whether or not it is coincident with a self address).
(4) TRTYERR: an indication that an error happens to occur in parity bits of the transmission data produced for each byte.
(5) CMPL: an indication to accomplish a frame transmission (a frame circulation).

Then, the reception frame status is constructed of the following items, for instance, as shown in FIG. 8B.
(1) RPTYERR: an indication that an error happens to occur in a parity bit of reception data generated for each byte.
(2) FCS: an indication whether or not an FCS field exists.
(3) DAEQMA: an indication whether or not is corresponds to a frame destined to a self station.
(4) SAEQMA: an indication whether or not an address of a sender contained in a reception frame is equal to MA (self station address).
(5) RAC1, RAC2: an indication of contents of A and C bits.
(6) RE1, RE2: an indication of a content of an E bit.

(7) FCSE: an indication whether or not it corresponds to an FCS (Frame Check Sequence) error.

(8) NDAT: an indication whether or not "Non Date" (representative of a signal which is not defined as data present in a protocol).

(9) OCT: an indication that an "Octet error" happens to occur when a frame is received.

(10) LOV: an indication that a frame is received with exceeding over an initially set maximum frame.

(11) ABT: an indication that an abort sequence is detected during the data reception.

(12) RCVD: an indication that a 1-frame reception has been completed.

The above-described frame statuses are transferred to the buffer memories 6-1 and 6-2 while transmitting or receiving an LLC frame.

Figure 9:
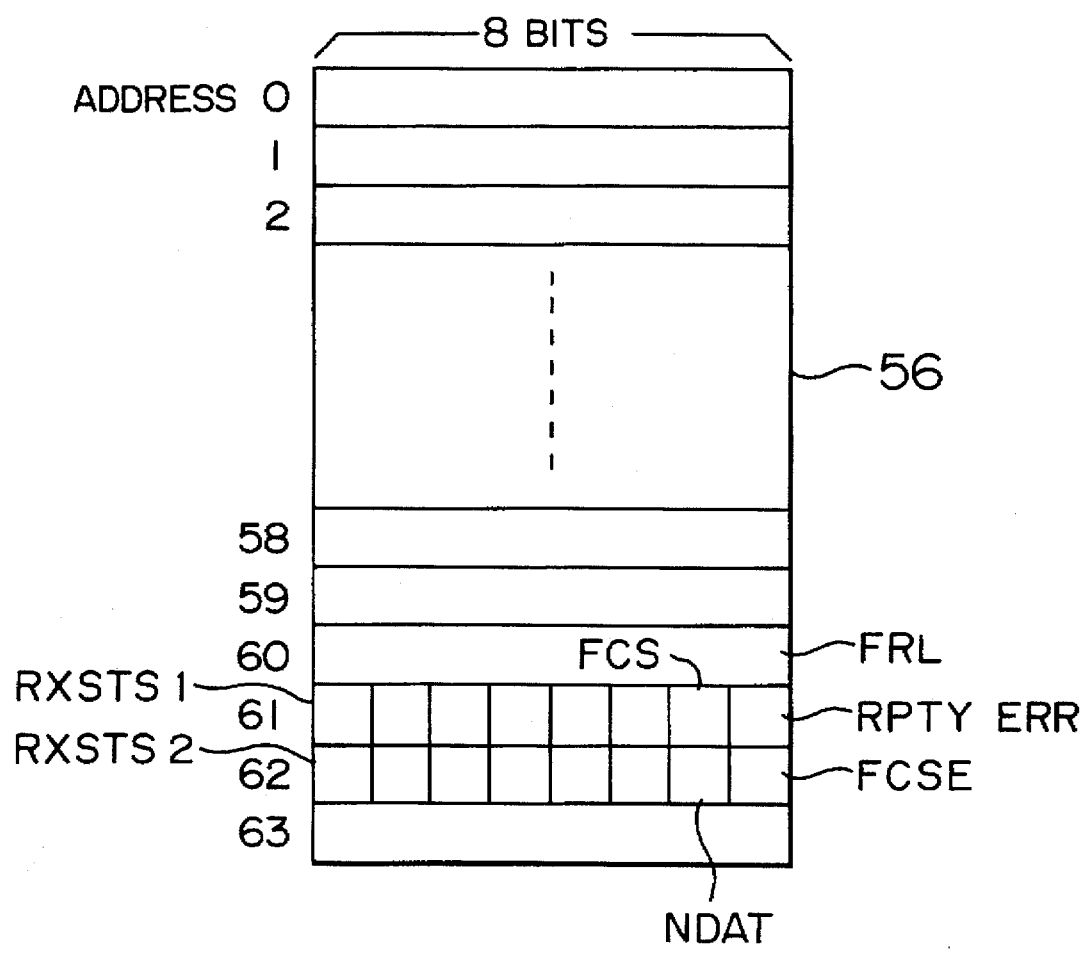
FIG. 9 schematically illustrates an arrangement of the frame status in MAC RAM shown in FIG. 7.

In FIG. 9, there is shown an arrangement of a MAC frame (58 bytes at maximum) for a frame status MAC RAM 56. In this case, the MAC RAM 56 is arranged by 8 bits×64 reads. A frame length FRL (Octet), frame statuses RXSTS1 and RXSTS2 (each including the statuses shown in FIGS. 8A and 8B) are sequentially inputted into the status area.

In accordance with this preferred embodiment, since the important error statuses such as RCVD, ABT, COV, RPTY, TPTY and FCSE are transferred to either the MAC RAM or buffer memory, both the CPU and host processor can quickly perform the error processing operation.

A description will now be made of a data/command transmit/receive method which is carried out via the system interface RAM 50 between the host processor 4 and data communication adapter 30 (CPU 52).

FIG. 10 represents a logic block diagram for representing an interface by a command register. Reference numeral 130 indicates a command register (corresponding to reference numeral 55 shown in FIG. 2); reference numerals 131 and 132 are channel selectors; reference numeral 52 indicates a CPU; reference numeral 134 indicates an OR gate; reference numeral 133 represents an AND-OR gate; and reference numeral 135 is an inverter gate.

The CPU write data appearing on the CPU dedicated write bus 51-2 and the host write data appearing on the internal host bus 62-2 are selected by the channel selector 131 and then written into the command register 130. This channel selector 131 selects the data appearing on the CPU write bus 51-2 when the CS (command selector) signal CMDSEL at the CPU side becomes "1", and selects the data appearing on the internal CPU host write bus 62-2 when this CS signal CMDSEL becomes "0" so as to be inputted into the command register 130. The latch signal 136 becomes a write timing signal for a command register after a selection is made between a host write enable HWE or a CPU write enable CWE in response to a CS signal HA0 at a host side and this CMDSEL signal. An output 137 of the command register 130 is read via the channel selector 132 and CPU dedicated read bus 51-1 by the CPU 52. In accordance with this preferred embodiment, there is a particular feature that a certain 1 bit within the command register 130 is used as an interruption signal 138 to the CPU 52, whereby the control circuit may be made small. It should be understood that although the CPU 52 can write the command register 130 for the diagnostic purpose, this CPU 52 may be operated in other method in accordance with this preferred embodiment.

FIG. 11 represents an access flow of an interface RAM 50. As described above, the host processor 4 produces an interface RAM access starting command and an interface RAM access ending command before and after such an access operation during which a parameter is set into the interface RAM 50, and also reports that it is under access operation to the CPU 52 by the above interruption. The CPU 52 can stop the access operation to the system interface RAM 50 during this time period, so that no access contention to this interface RAM 50 may not occur. In accordance with this preferred embodiment, since the command response is returned to the host processor 4 with respect to the generation of the command, the handshake interface can be firmly established and thus the reliability of the data can be improved. This response method will be described later.

Figure 12:
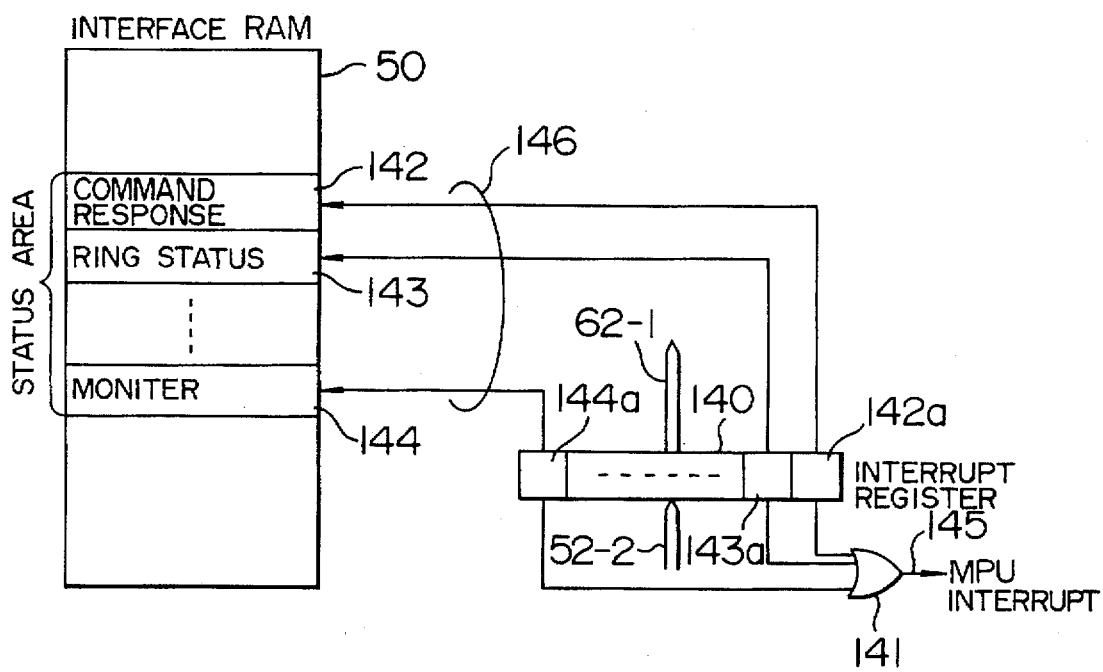
FIG. 12 schematically illustrates one example of a major arrangement of a data communication adapter for performing a status report via a system interface RAM.

In FIG. 12, there is shown a preferred embodiment relating to a status reporting method via a system interface RAM 50.

In FIG. 12, reference numeral 50 indicates a system interface RAM; reference numeral 140 denotes an interrupt register; and reference numeral 141 represents an OR gate. Into a status area of the system interface RAM 50, a status group such as a command response status 142, a ring status 143, and a monitor status 144 is stored. It should be noted that the command response status represents a condition indicating whether or not a command has been normally accepted by an adapter when the command was produced from the host processor. The ring status represents such a specific status for the MAC RAM or interface RAM which has been produced in either the CPU or interface RAM. Also the monitor status indicates such a status that a result of a diagnosis effected in the CPU is represented. Each of the status group corresponds to each bit of these interrupt registers, and a drawn line 146 shown in FIG. 12 corresponds to an imaginary line representative of this relationship. A function of the CPU is to write a bit value into the relevant status area within the system interface RAM 50 and to write "1" into the relevant bit of the interrupt register 140. An interrupt signal 145 is asserted when the bit is written into the above-described interrupt register, the host processor 4 reads the interrupt register after accepting the interruption so as to sense an interrupt cause status group and also to read this status word in the system interface RAM 50.

Figure 13:
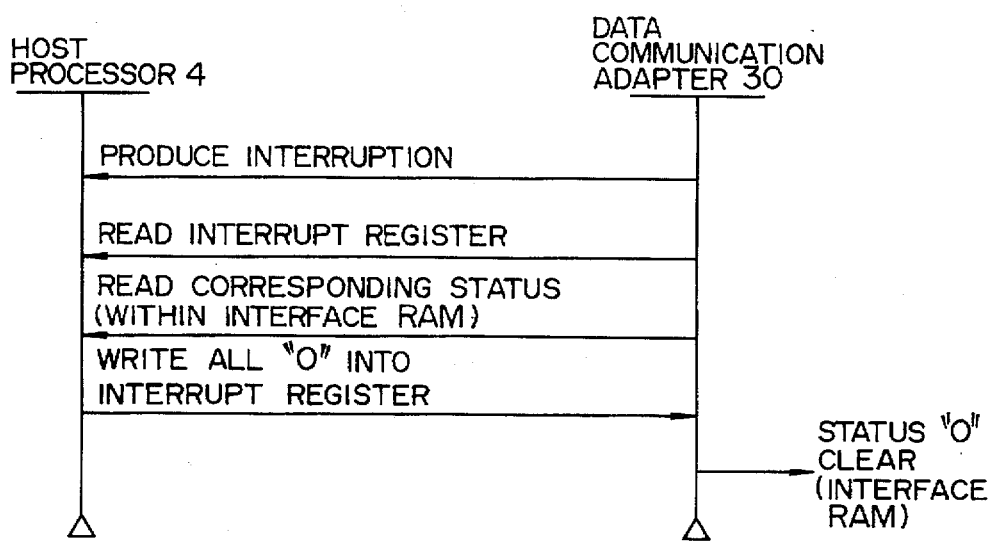
FIG. 13 is an operation flow chart for explaining the operation of the communication adapter shown in FIG. 12.
Figure 14:
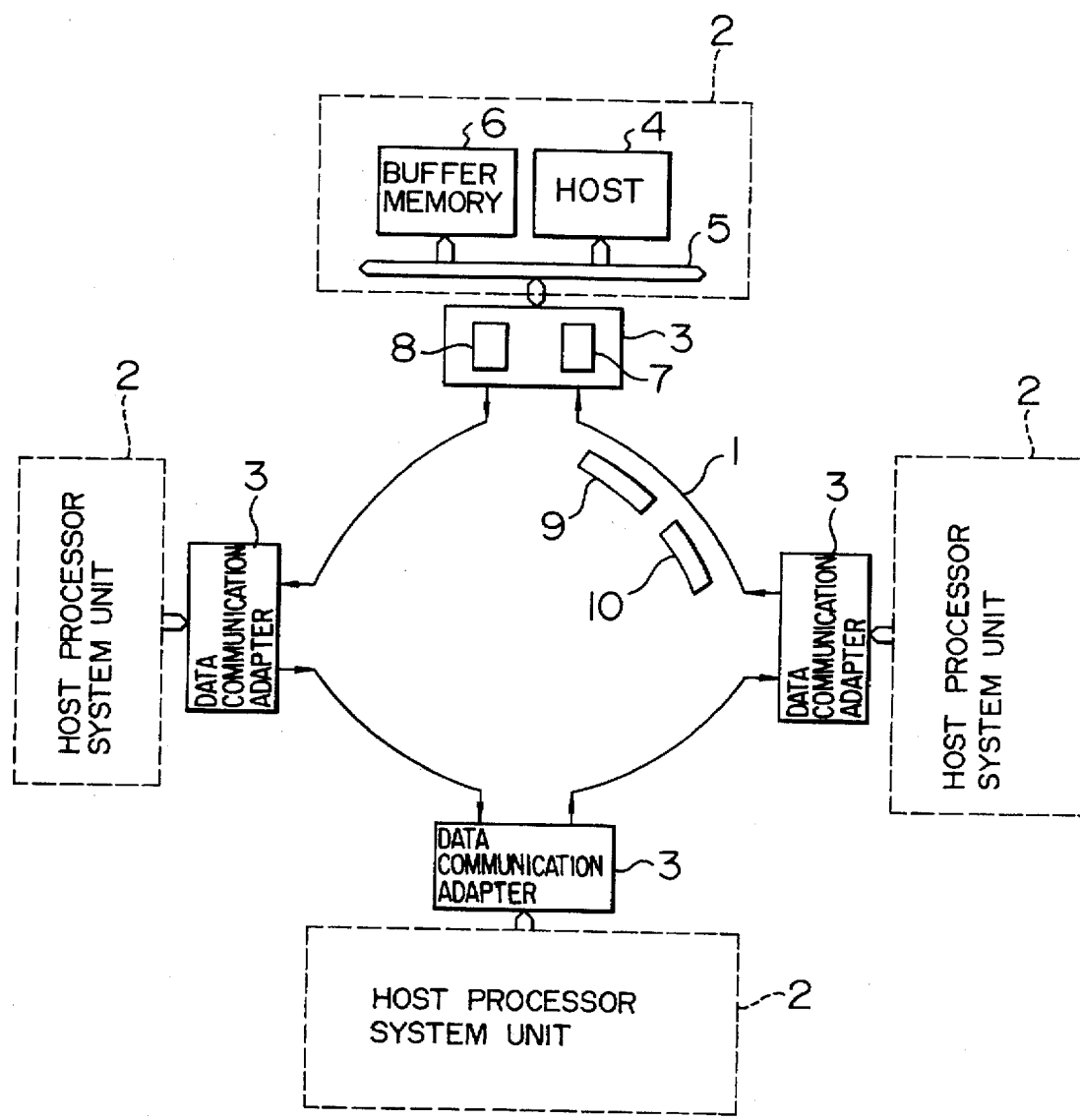
FIG. 14 is a schematic block diagram of an example of a construction of a LAN system.
Figure 15:
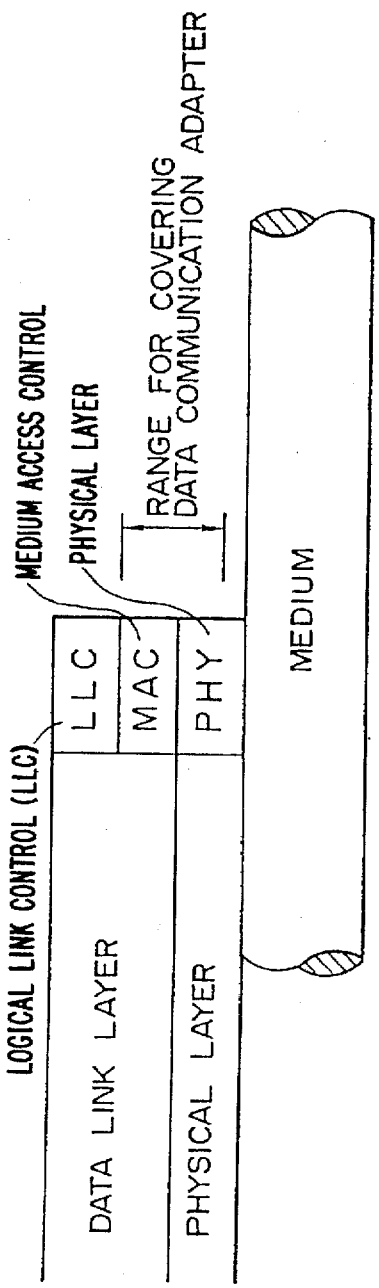
FIG. 15 is an explanatory diagram of an OSI reference model.
Figure 16:
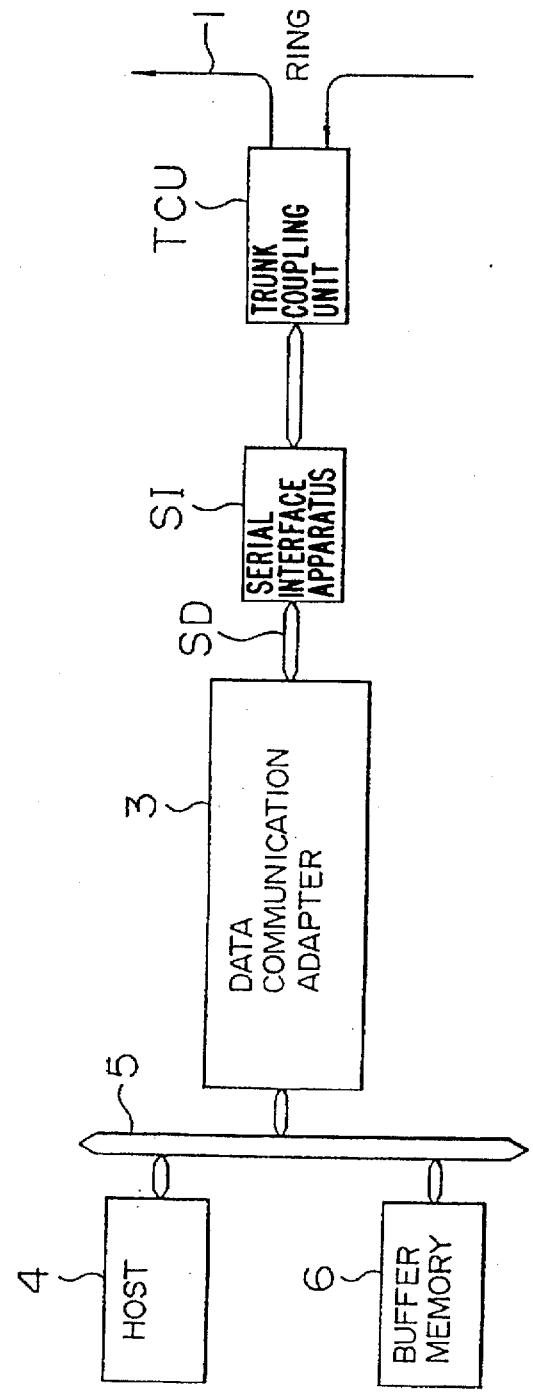
FIG. 16 is a schematic block diagram of an example of an arrangement of the data communication terminal apparatus shown in FIG. 14.
Figure 17A:
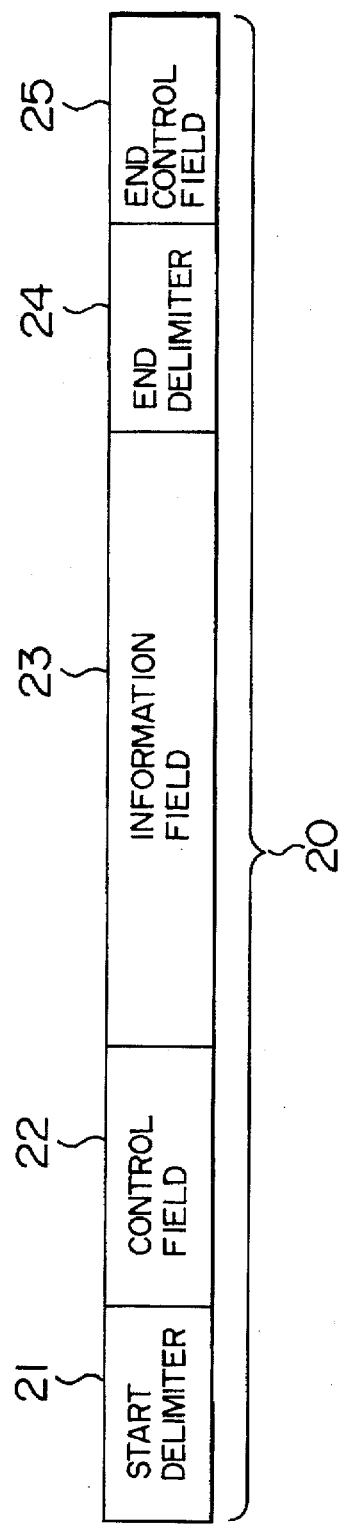
FIGS. 17A and 17B are illustrations for representing one example of data flows through the signal transmission path in the LAN system; and, FIG. 18 is a schematic block diagram of an arrangement of one conventional data communication terminal apparatus.
Figure 17B:
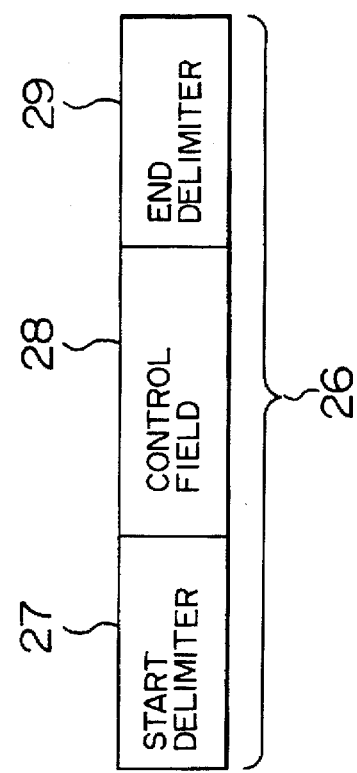

A process flow at this time is represented in FIG. 13. The host processor 4 writes all "0" into the interrupt register after reading the status so as to clear the interrupt register. The CPU 52 detects the above-described writing of all "0" and thereafter clears the status of the system interface RAM 50. In this preferred embodiment, after the CPU 52 causes the interrupt register to be active, the CPU 52 reads the interrupt register while the host processor performs the interrupt process, so that the CPU 52 does not return to the main program until all "0" is read. As a consequence it is not required to produce a RAM access starting/ending command before and after the status is read. It should be noted that there is no practical problem, since the CPU can read all "0" of the interrupt register at least after the second read access even when the "0" write access effected by the host process to the interrupt register 140 competes with the read access performed by the CPU.

According to this preferred embodiment, the interface having the better quality can be realized by a small-scaled logic circuit between the host processor and the CPU employed in the data communication adapter.

The above-explained command response has such a function that the command response status is returned to the host processor in the status report as described in this preferred embodiment. The host processor reads/writes the interface RAM after confirming this command response status. The command response status 142 contains such information whether or not the command has been normally accepted during the command production, and also relating to the error content (code) when the command has not been normally accepted.

As previously explained the higher reliabilities on the quick report of the frame status can be achieved by the following arrangement.

That is to say, there is employed such a circuit that the frame status information produced from the frame in the data communication adapter (in the serial transmission/reception control unit 59) is DMA-transferred together with this frame data into the reception MAC RAM 56 or buffer memory 6 and this frame status information is reported to the CPU 52 or host processor 4 when the transmitted frame is circulated in the signal transmission path or the frame is received. Also, there is further employed such a circuit that a sort of a received frame (which should be interpreted by the data communication adapter 30 or host processor 4) is detected a destination of the above-described frame status information is determined.

Then, there is employed such a circuit that when the host processor 4 accesses the status interface RAM 50, the RAM access starting command and also RAM access ending command are written before and after this access operation, and the written command code is reported to the CPU 52 in order to prohibit that the CPU 52 accesses the interface RAM 50 during the access period.

As a result, since the wait generating circuit for preventing the contention occurring at the simultaneous access operation is no longer required, the logic circuit scale can be made small, and furthermore, the host process can readily read/write/access the system interface RAM.

To quickly performing at a high efficiency, reporting the status happening to occur in the data communication adapter 30 to the host processor 4, the below-mentioned circuit arrangement has been employed.

That is to say, there is employed an interrupt adapter 140 readable and writable by the CPU 52, in which each bit indicates each of the grouped status groups and an OR logic output of the bit output from this interrupt register is used as an interrupt signal to the host processor.

The CPU 52 writes the status bit into the relevant status area of the system interface RAM 50 when the status to be reported happens to occur, and subsequently writes "1" into the relevant bit of the interrupt register 140. After the host processor 4 senses the interrupt signal, the interrupt register 140 is read and then the corresponding status groups are read. Then, all "0" is written into the interrupt register after the status reading operation so as to complete the interrupt process. The CPU 52 clears the status within the system interface RAM 50 after confirming that the interrupt register 140 has been cleared.

With this arrangement, since the access operation to the system interface RAM 50 is carried out in the handshake method, the access contention never occur and therefore the status can be easily reported to the host processor 4.

There are the following particular advantages in the data communication adapter and data communication terminal apparatus according to the present invention as follows.

Since the system bus 5 is separately provided with the CPU dedicated bus 51, and the transmitted/received data processing systems are independently established for the LLC/MAC frames, there is a particular effect that the frame processing capability becomes high. Furthermore, since the interface method by the system interface RAM 50 and interrupt register is introduced, the data transmission/reception, control and status report can be realized at higher efficiency with higher reliabilities between the host processor system and data communication adapter.

In addition thereto, there is another particular advantage that the rapid recovery and also rapid processing for the error causes can be achieved with handling the data at the higher reliability due to the employment of the parity check function and frame status transfer function. Finally, since both the control for the LLC layer and control for the MAC layer are realized with the separated architectures of the host processor system and data communication adapter, both of the processor system and communication adapter are operable with better continuation and are suitably manufactures by an LSI chip. As apparent from the foregoings, the present invention is not limited to the above-described LAN (local area network) system, but may be applied to a terminal unit for a general-purpose digital communication. For instance, the present invention may be utilized in an Ethernet type LAN system, B-channel/D-channel controllers for ISDN (Integrated Services Digital Network), and also an exchange terminal apparatus (e.g., a control for a Private Branch Exchange).

We claim:

1. A data communication adapter apparatus operatively connected between a signal transmission path for transmitting both receive data and transmit data, and a host processor unit for producing/interpreting frame data of a first type and for transmitting/receiving the frame data, said data communication adapter comprising:

a central processing unit for producing/interpreting frame data of a second type and transmitting/receiving the produced frame data;

a transmission/reception control unit operatively connected to said signal transmission path, for transmitting transmit data to said signal transmission path and for receiving receive data from said signal transmission path;

a bus interface operatively connected to said host processing unit;

an internal bus operatively connected to said bus interface;

a CPU (central processing unit) bus operatively connected to said CPU;

a transmission FIFO (first-in-first-out) memory having inputs operatively connected to said CPU bus and to said internal bus, and having an output operatively connected to said transmission/reception control unit, said transmission FIFO memory stores therein the frame data of the first and second types derived from said CPU and said host processor, and transmits said frame data to said transmission/reception control unit as said transmit data;

a reception memory having an input operatively connected to said transmission/reception control unit and having an output operatively connected to said CPU bus, said reception memory stores therein frame data of the second type to be interpreted in said data communication adapter among the receive data received by said transmission/reception control unit, and transmits the frame data of the second type to said CPU bus;

a reception FIFO memory having an input operatively connected to said transmission/reception control unit and having an output operatively connected to said internal bus, said reception FIFO memory stores therein frame data of the first type to be interpreted by said host processor unit among the receive data received by said transmission/reception control unit, and transmits the frame data of the first type to said internal bus; and first coupling means for interconnecting said bus interface and said CPU bus to achieve communications between said host processor unit and said CPU through said first coupling means.

2. A data communication adapter apparatus as claimed in claim 1, further comprising second coupling means for operatively connecting said bus interface and said CPU bus, said host processor accessing said data communication adapter through said second coupling means.

3. A data communication adapter apparatus as claimed in claim 1, further comprising:
a second memory operatively connected between said bus interface and a second CPU bus.

4. A data communication adapter apparatus as claimed in claim 3, wherein said second memory includes:
means mutually accessible from both said host processor unit and said data communication adapter.

5. A data communication adapter apparatus as claimed in claim 1, wherein said transmission/reception control unit includes means for generating a parity bit so as to add said parity bit to the receive data;
said bus interface includes means for performing a parity check with respect to the frame data of the first type to which said parity bit has been added, the frame data of the first type has been transferred from said reception FIFO memory and input to said transmission FIFO memory via said internal bus; and
said data communication adapter includes means for performing a parity check with respect to the frame data of the second type data to which said parity bit has been added, the frame data of the second type has been further read out from said reception memory and transmitted via said CPU bus.

6. A data communication adapter apparatus as claimed in claim 1, wherein said data communication adapter further includes means for producing a parity bit so as to add said parity bit to the frame data of the second type which has been generated by said CPU and transferred into said transmission FIFO memory;
said bus interface includes means for executing a parity check with respect to the frame data of the first type to which the parity bit derived from said host processor unit has been added, and for transferring said frame data of the first type with said parity bit via said internal host bus into said transmission FIFO memory; and
said transmission/reception control unit includes means for performing a parity check with respect to the transmit data which has been read from said transmission FIFO memory.

7. A data communication adapter apparatus as claimed in claim 1, further comprising:
means for producing a second frame status based upon the frame data of the second type among the receive data which have been received by said transmit/receive control unit, and also for producing a first frame status based upon the frame data of the first type;
means for storing said second frame status together with the frame data of the second type into said reception FIFO memory; and
means for transferring said first frame status together with the frame data of the first type via said reception FIFO memory, internal bus and bus interface to said host processor unit.

8. A data communication terminal apparatus connected to a signal transmission path and including a data communication adapter and a host processor unit having a host processor for producing/interpreting frame data of a first type and connected to the signal transmission path through the data communication adapter, said data communication adapter comprising:
a central processing unit for producing/interpreting frame data of a second type;
a transmission/reception control unit operatively connected to said signal transmission path, for transferring transmit data to said signal transmission path and for receiving receive data from said signal transmission path;
a bus interface operatively connected to said host processor unit;
an internal bus operatively connected to said bus interface;
a CPU (central processing unit) bus operatively connected to said CPU:
a transmission FIFO (first-in-first-out) memory having inputs operatively connected to said CPU bus and to said internal host bus, and having an output operatively connected to said transmission/reception control unit, transmission FIFO memory stores therein the frame data of the first and second types derived from said host processor unit and said CPU and transmits said frame data to said transmission/reception control unit as said transmit data;
a reception memory having an input operatively connected to said transmission/reception control unit and having an output operatively connected to said CPU bus, said reception memory stores therein frame data of the second type among the receive data received by said transmission/reception control unit, said frame data of the second type being interpreted in said data communication adapter, and transmits the frame data of the second type to said CPU bus;
a reception FIFO memory having an input operatively connected to said transmission/reception control unit and having an output operatively connected to said internal bus, said reception FIFO memory stores therein frame data of the first type among the receive data received by said transmission/reception control unit, said frame data of the first type being interpreted by said host processor unit, and transfers said frame data of the first type to said internal bus; and
a first coupling means operatively connected between said bus interface and said CPU bus.

9. A data communication adapter apparatus operatively connected between a signal transmission path for transmitting both receive data and transmit data, and a host processor unit for producing frame data of a first type and for transferring/receiving the frame data of the first type, said data communication adapter comprising:
data processing means for generating/interpreting frame data of a second type and outputting the frame data of the second type;
transmission/reception means operatively connected to said signal transmission path, for transmitting transmit data to said signal transmission path and for receiving receive data from said signal transmission path;
first bus interface means for transmitting/receiving data between said host processor unit and said data communication adapter;
first bus means for performing a data transmission;
second bus means for performing a data transmission;
second bus interface means for transmitting/receiving data via said first bus interface means between said host processor unit and said data processing means;

transmitting memory means for storing the frame data of the first type which has been transferred from said host processor unit via said first bus interface means and first bus means, storing the frame data of the second type which has been transferred from said data processing means via said second bus means, and transferring both said frame data of said first and second types to said transmission/reception means as transmission data;

second receiving memory means for storing therein frame data of the second type to be interpreted by said data communication adapter apparatus among the receive data which have been received by said transmission/reception means, and transferring said frame data of the second type to said second bus means; and first receiving memory means for storing therein frame data of the first type to be interpreted by said host processor among the receive data which have been received by said transmission/reception means, and transferring said frame data of the first type to said first bus means.

10. A data communication adapter apparatus as claimed in claim 9, wherein said second repeating means includes means for enabling access from said host processor unit via said first repeating means to said data communication adapter apparatus.

11. A data communication adapter apparatus as claimed in claim 9, further comprising:

third repeating means capable of transmitting/receiving the data between said host processor unit and said data communication adapter apparatus via said first repeating means and second bus means.

12. A data communication adapter apparatus as claimed in claim 11, wherein said third repeating means includes:

means for enabling access mutually from both said host processor unit and said data communication adapter apparatus.

13. A data communication adapter apparatus as claimed in claim 9, wherein said transmission/reception means includes means for generating a parity bit so as to add said parity bit to the receive data;

said first repeating means includes means for performing a parity check with respect to the frame data of the first type to which said parity bit is added, the frame data of the first type has been read from said second receiving memory means and received via said second bus means; and said data communication adapter apparatus includes means for performing a parity check with respect to the frame data of the second type to which said parity bit is added, the frame data of the second type has been further read out from said first receiving memory means and inputted via said first bus means.

14. A data communication adapter apparatus as claimed in claim 9, wherein said data communication adapter apparatus further includes means for producing a parity bit so as to add said parity bit to the frame data of the second type which has been generated by said data processing means and inputted into said transmitting memory means;

said first repeating means includes means for executing a parity check with respect to the frame data of the second type to which said parity bit derived from said host processor unit has been added, and for inputting said frame data via said second bus means into said transmitting memory means; and said transmission/reception means includes means for performing a parity check with respect to the transmit data which has been read from the transmitting memory means.

15. A data communication adapter apparatus as claimed in claim 9, further comprising:

means for producing a second frame status based upon the frame data of the second type among the receive data which have been received by said transmission/reception means, and for producing a first frame status based upon the frame data of the first type;

means for storing said second frame status together with the frame data of the second type into said first receiving memory; and means for transferring said first frame status together with the frame data of the first type via said second receiving memory means, second bus means and first repeating means to said host processor unit.

16. A data communication terminal apparatus connected to a signal transmission path and including a data communication adapter and a host processor unit having host processor for producing/interpreting frame data of a first type and connected to the signal transmission path through the data communication adapter, said data communication adapter comprising:

data processing means for generating/interpreting frame data of a second type and for transferring/receiving the frame data;

transmission/reception means operatively connected to said signal transmission path, for transmitting transmit data to said signal transmission path and for receiving receive data derived from said signal transmission path;

first bus interface means for transmitting/receiving data between said host processor unit and said data communication adapter;

first bus means for performing a data transmission;

second bus means for performing a data transmission;

second bus interface means for transmitting/receiving data via said first bus interface means and said data processing means between said host processor unit and said data processing means;

transmitting memory means for storing the frame data of the first type which has been transferred from said host processor unit via said first bus interface means and first bus means, for storing the frame data of the second type which has been transmitted from said data processing means via said second bus means, and for transferring both said frame data of the first and second types to said transmission/reception means as transmission data;

second receiving memory means for storing therein frame data of the second type to be interpreted by said data communication adapter apparatus among the receive data which have been received by said transmission/reception means, and for transferring said frame data of the second type to said first bus means; and first receiving memory means for storing therein frame data of the first type to be interpreted by said host processor among the receive data which have been received by said transmission/reception means, and for transferring said frame data of the first type to said first bus means.

17. A data communication adapter apparatus operatively connected between a signal transmission path for transmitting both receive data and transmit data, and a host processor unit for producing/interpreting frame data of a first type and for transmitting/receiving the frame data, said data communication adapter comprising:

a central processing unit (CPU) for producing/interpreting frame data of a second type and transmitting/receiving the produced frame data;

a transmission/reception control unit operatively connected to said signal transmission path, for transmitting transmit data to said signal transmission path and for receiving receive data from said signal transmission path;

a transmission FIFO (first-in-first-out) memory which stores therein the frame data of the first and second types derived from said CPU and said host processor, and transmits said frame data to said transmission/reception control unit as said transmit data;

a reception memory which stores therein frame data of the second type to be interpreted in said data communication adapter among the receive data received by said transmission/reception control unit, and transmits the frame data of the second type to said CPU bus;

a reception FIFO memory which stores therein frame data of the first type to be interpreted by said host processor unit among the receive data received by said transmission/reception control unit, and transmits the frame data of the first type to said host processing unit; and first coupling means for interconnecting said host processor unit and said CPU to achieve communications between said host processor unit and said CPU through said first coupling means.

18. A data communication terminal apparatus connected to a signal transmission path and including a data communication adapter and a host processor unit having a host processor for producing/interpreting frame data of a first type and connected to the signal transmission path through the data communication adapter, said data communication adapter comprising:

a central processing unit (CPU) for producing/interpreting frame data of a second type;

a transmission/reception control unit operatively connected to said signal transmission path, for transferring transmit data to said signal transmission path and for receiving receive data from said signal transmission path;

a transmission FIFO (first-in-first-out) memory which stores therein the frame data of the first and second types derived from said host processor unit and said CPU and transmits said frame data to said transmission/reception control unit as said transmit data;

a reception memory which stores therein frame data of the second type among the receive data received by said transmission/reception control unit, said frame data of the second type being interpreted in said data communication adapter, and transmits the frame data of the second type to said CPU bus;

a reception FIFO memory which stores therein frame data of the first type among the receive data received by said transmission/reception control unit, said frame data of the first type being interpreted by said host processor unit, and transfers said frame data of the first type to said host processor unit; and a first coupling means operatively connected between said host processor unit and said CPU.

* * * * *